(12) United States Patent
Cavallaro

(10) Patent No.: US 11,582,954 B2
(45) Date of Patent: Feb. 21, 2023

(54) ANIMAL RESTRAINT SYSTEM

(71) Applicant: Kevin Cavallaro, Brooklyn, NY (US)

(72) Inventor: Kevin Cavallaro, Brooklyn, NY (US)

(73) Assignee: Kevin Cavallaro, Brooklyn, NY (US)

( * ) Notice: Subject to any disclaimer, the term of this patent is extended or adjusted under 35 U.S.C. 154(b) by 0 days.

(21) Appl. No.: 17/858,158

(22) Filed: Jul. 6, 2022

(65) Prior Publication Data
US 2022/0330525 A1      Oct. 20, 2022

Related U.S. Application Data

(63) Continuation of application No. 16/906,152, filed on Jun. 19, 2020, now Pat. No. 11,406,085.

(60) Provisional application No. 62/864,246, filed on Jun. 20, 2019.

(51) Int. Cl.
    *A01K 27/00* (2006.01)

(52) U.S. Cl.
    CPC .......... *A01K 27/003* (2013.01); *A01K 27/001* (2013.01); *A01K 27/002* (2013.01); *A01K 27/005* (2013.01)

(58) Field of Classification Search
    CPC .... A01K 27/003; A01K 27/00; A01K 27/001; A01K 27/002
    See application file for complete search history.

(56) References Cited

U.S. PATENT DOCUMENTS

| | | | |
|---|---|---|---|
| 754,241 A | 3/1904 | Roll | |
| 1,509,781 A | 9/1924 | Adolph | |
| 2,289,802 A | 7/1942 | Norton | |
| 3,006,322 A * | 10/1961 | Vitol | A01K 27/005 119/863 |
| 3,096,741 A * | 7/1963 | Ollstein | A01K 27/001 119/792 |
| 3,266,464 A | 8/1966 | Davis | |
| 3,752,127 A * | 8/1973 | Baker | A01K 27/003 119/797 |
| 4,841,915 A * | 6/1989 | Rocchetti | A01K 27/001 119/864 |
| 5,711,255 A | 1/1998 | Rudolph | |
| 5,713,308 A | 2/1998 | Holt, Jr. | |
| 5,785,010 A | 7/1998 | Koch | |
| 5,934,224 A * | 8/1999 | Sporn | A01K 27/002 119/792 |
| 6,085,694 A | 7/2000 | Simon | |
| 6,401,666 B1 | 6/2002 | Kircher | |
| 6,481,384 B2 | 11/2002 | Jacobs | |
| 6,619,238 B1 | 9/2003 | Amato | |
| 7,066,113 B2 * | 6/2006 | Cheng | A01K 27/005 119/863 |
| 7,243,615 B1 | 7/2007 | Hendrie | |
| 7,685,972 B2 | 3/2010 | Zacho | |
| D615,253 S | 5/2010 | Goodell | |
| 8,100,090 B1 | 1/2012 | Sutter | |
| 8,281,748 B2 | 10/2012 | Elkins et al. | |
| D695,469 S | 12/2013 | Dougherty | |
| 9,179,648 B1 | 10/2015 | Fidrych | |

(Continued)

*Primary Examiner* — Kristen C Hayes

(74) *Attorney, Agent, or Firm* — Jessica Ergmann

(57) ABSTRACT

Systems, devices and methods for restraining animals are disclosed. The system includes various collar, harness and leash designs. The collars, harnesses and leashes can include various size adjustor assemblies. The designs can be modular and scalable for improved functionality.

17 Claims, 23 Drawing Sheets

(56) References Cited

U.S. PATENT DOCUMENTS

| | | |
|---|---|---|
| 9,271,476 B1 | 3/2016 | Flynn |
| D796,124 S | 8/2017 | Ying |
| 10,194,641 B1* | 2/2019 | Benabud .............. A01K 27/006 |
| 2009/0071417 A1 | 3/2009 | Simmensen |
| 2010/0043722 A1 | 2/2010 | Elkins |
| 2014/0202397 A1* | 7/2014 | Bentley ................ A01K 27/002 |
| | | 119/863 |
| 2015/0226254 A1 | 8/2015 | Nonoguchi et al. |
| 2016/0338322 A1 | 11/2016 | Letke |
| 2017/0112105 A1* | 4/2017 | Johnson ................ A01K 37/00 |
| 2018/0168129 A1 | 6/2018 | Dunbar |

* cited by examiner

ANIMAL RESTRAINT SYSTEM

RELATED APPLICATIONS

This application claims priority to U.S. Provisional Application Ser. No. 62/864,246 filed on Jun. 20, 2019 and U.S. application Ser. No. 16/906,152.

FIELD OF THE INVENTION

The present invention relates generally to systems, devices and methods, for restraining animals, and more specifically to systems, devices, and methods for adjustable and modular animal restraint devices.

BACKGROUND OF THE INVENTION

In using animal restraints, for example for use with a dog, it is common for the dog to pull on the leash resulting in choking of the dog. It is also common to for restraints to lack flexibility in size adjustment and the ability to attach various components, for example various types of handles. Therefore, it is desirable to provide systems, devices, and methods for improved animal restraint systems.

SUMMARY

According to an aspect of the invention, an animal restraint system includes a cord and an adjustor assembly including at least one adjustor ring and at least one locking ring, where the cord length is adjustable when the adjustor assembly is in an unlocked position and the cord length is fixed when the adjustor assembly is in a locked position. In some embodiments, the adjustor assembly comprises one adjustor ring and one locking ring. In some embodiments, the adjustor assembly comprises two adjustor rings and one locking ring. In some embodiments, the adjustor assembly comprises two adjustor rings and two locking rings.

According to an aspect of the invention, an animal restraint system includes a cord and an adjustor assembly including a first knot adjacent to a double loop ring and a second knot adjacent to a joint, where the cord length is adjustable when the double loop ring is in an unlocked position and the cord length is fixed with the double loop ring is in a locked position. In some embodiments, the system further includes a first ring adjacent to the first knot. In some embodiments, the system further includes a second ring adjacent to the second knot. In some embodiments, the system further includes a third ring adjacent to the second knot. In some embodiments, the system further includes a fourth ring configured to attach the cord to a leash.

In some embodiments, cord can include a first end and a second end and where a first ring positioned on the cord first end and a second ring positioned on the cord second end, where the first ring is configured to feed through the second ring and decrease the size of the cord upon force applied to the first ring.

According to another aspect of the invention, an animal restraint system includes a cord and an adjustor assembly including a first ring adjacent to a second ring, and a third ring adjacent to the second ring, where the cord length is adjustable when the first and second rings are in an unlocked position and the cord length is fixed when the first and second rings are in a locked position.

According to another aspect of the invention, an animal restraint system includes a cord and an adjustor assembly including a first knot adjacent to a first ring and a second ring, where the cord length is adjustable when the second ring is in an unlocked position and the cord length is fixed when the second ring is in a locked position.

According to any of the above aspects of the invention, the cord can be configured as a collar or a harness. In some embodiments the collar or harness cords are continuous. In some embodiments, the continuous cord has two ends that form a joint, where as an example, the joint can be mechanically secured. Any portion of cord can be twisted.

In some embodiments, a harness can include a first looped end and a second looped end, and the system further comprises a connector including a first ring and a second ring, where the first ring is configured to be fed through the first looped end and secured in position via the first and second rings.

According to any of the above aspects on the invention, the system can further include a leash. In some embodiments, the leash includes a first end and a second end where the first end connects to a cord via a hook and the second end comprises a handle. The leash can be configured from a continuous cord. A portion of the leash cord can be twisted.

In some embodiments, the leash can include a modular design, for example a handle can be connectable to the leash. In these embodiments, the leash can include a first end including a hook and a second end including a ring, and the handle can include a first and second looped end, where the handle attaches to the leash by feeding the first looped end through the leash first end ring and pulling the handle through the leash first end ring. In some embodiments, the size of the handle looped ends can be adjustable. For example, handle can include a first ring, a second ring and a knot configured to adjust the size of the handle second looped end.

In some embodiments, the leash can include a first end including a ring, a second end and a hook, where the hook is positioned on the leash between the first end and the second end and is configured to connect to the ring to create a handle.

According to another aspect of the invention, an animal restraint device includes a collar, an adjustor assembly and a leash, where the adjustor assembly comprises a first ring adjacent to a second ring, and a third ring adjacent to the second ring, where the collar size is adjustable when the first and second rings are in an unlocked position and the collar size is fixed when the first and second rings are in a locked position. In some embodiments, the device can include a single piece of continuous cord.

According to any of the above aspects of the invention, the cord can include at least one of a rope, wire, string or cable. In some embodiments, the cord includes paracord. In some embodiments, the cord includes an outer sheath. In some embodiments, the cord includes nylon. In some embodiments, the cord has a tensile strength ranging from 1000 lb to 1600 lbs, for example 1200 lb. In some embodiments, the cord has a diameter ranging from $\frac{1}{8}$" to $\frac{1}{2}$", for example $\frac{3}{4}$". Any of the above described knots can include any type of knot, for example a loop over knot or a slip loop knot. In some embodiments, the knot is configured to distribute force away from a nearby joint.

The technology described herein, along with the attributes and attendant advantages thereof, will best be appreciated and understood in view of the following detailed description taken in conjunction with the accompanying drawings in which representative embodiments are described by way of example.

DETAILED DESCRIPTION OF THE DRAWINGS

Figure 1:
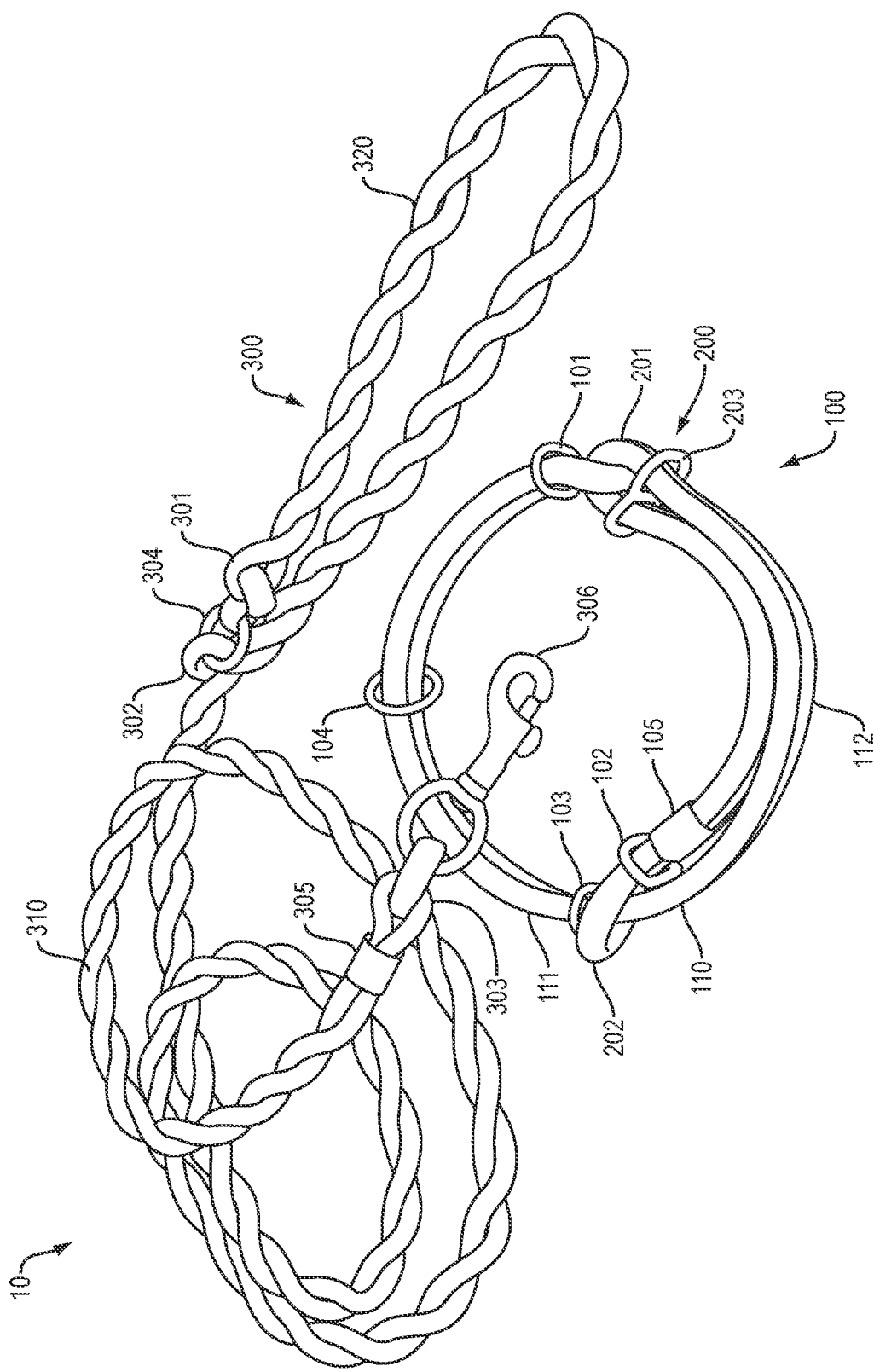
FIG. 1 is a schematic of a system for restraining an animal, consistent with the present invention.

Reference will now be made in detail to the present embodiments of the technology, examples of which are illustrated in the accompanying drawings. The same reference numbers are used throughout the drawings to refer to the same or like parts.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on", "attached", "connected" or "coupled" to another element, it can be directly on or above, or connected or coupled to, the other element or intervening elements can be present. In contrast, when an element is referred to as being "directly on", "directly attached", "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in a figure is turned over, elements described as "below" and/or "beneath" other elements or features would then be oriented "above" the other elements or features. The device can be otherwise oriented (e.g., rotated 90 degrees or at other orientations) and the spatially relative descriptors used herein interpreted accordingly.

The term "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. For example, it will be appreciated that all features set out in any of the claims (whether independent or dependent) can be combined in any given way.

As used herein, a cord can include a rope, wire, string, cable or any other suitable material. In some embodiments, the cord can include a nylon material. In some embodiments, cord can include a paracord. Cord can have any suitable tensile strength, for example a tensile strength ranging from 1000 lb to 1600 lb. Cord can have any suitable diameter, for example a diameter ranging from 1/8" to 1/2". Cord can have an outer sheath and any number of inner strands. As an example, the cord can be ParaMax Cord 32 strand woven nylon outer sheath having a 1200 lb tensile strength, 1/4" diameter, and three inner strands. The cord can also be rot and UV fade resistant. The cord can maintain tension when twisted and does not reverse twist once knotted. The cord can be shrunk by submerging in hot water which can assist in tightening the cord and provide additional configurability. Also as used herein, rings, hooks and crimps can include any suitable material such as a metal, for example, brass. Rings, hooks and crimps can be any suitable size and shape relative to the cord used. Any number of rings, hooks and crimps can be used with any of the collars, harnesses and leashes described herein to hold portions of cord together.

The present invention comprises a system for restraining an animal comprising a cord and an adjustor assembly, where the adjustor assembly comprises at least one adjustor ring and at least one locking ring, where the cord length is adjustable when the adjustor assembly is in an unlocked position and the cord length is fixed when the adjustor assembly is in a locked position. In some aspects, the adjustor assembly comprises one adjustor ring and one locking ring. In some aspects, the adjustor assembly comprises two adjustor rings and one locking ring. In some aspects, the adjustor assembly comprises two adjustor rings and two locking rings. The system can be configured as a collar or a harness and can be configured to attached to a leash.

FIG. 1 is a schematic of system 10 for restraining an animal, including collar 100, adjustor assembly 200 and leash 300. In the illustrated embodiment, collar 100 includes continuous cord 110 having joint 105, first ring 101, second ring 102, third ring 103, and fourth ring 104. First, second and third rings 101-103 are optionally included to secure cord 110 together. Fourth ring 104 can be used to connect collar 100 to a leash such as leash 300, 300' or 1900 (described herein). Optionally, collar 100 can include at least a portion of cord 110 that is twisted, for example cord portion 112.

In the illustrated embodiment, collar 100 length or size, specifically its circumference, is adjustable via adjustor assembly 200. Adjustor assembly 200 includes first knot 201, second knot 202 and double loop ring 203. To adjust the size of collar 100, double loop ring 203 is moved to an unlocked position by sliding along cord 110 away from first knot 201. Then, first cord portion 111 can be adjusted relative to second cord portion 112 until collar 100 is adjusted to the desired size. After collar 100 is adjusted to the desired size, double loop ring 203 is moved to a locked position by sliding along cord 110 toward first knot 201.

A method for making collar 100 can include the following steps: using one continuous piece of cord 110, fold cord 110 in half, slide first ring 101 to folded end of cord 110 creating a small loop, slide fourth ring 104 onto cord 110, slide third ring 103 onto cord 110, slide both ends of cord 110 through one loop of double loop ring 203, slide both ends of cord 110 through the small loop of cord 110 at folded end creating knot 201, slide both ends of cord 110 through second loop of double loop ring 203, slide one end of cord 110 onto second ring 102, wrap around the entire cord 110 creating knot 202 and back through second ring 102, and connect two ends of cord 110 at joint 105, for example, a clamp.

Collar 100 can connect to a leash such as leash 300. In the illustrated embodiment, leash 300 comprises continuous cord 310 having joint 305, first knot 301, second knot 302, third knot 303, ring 304, hook 306 and handle 320. Hook 306, for example, a swivel snap, can be used to connect leash 300 to a collar such as collar 100, for example via ring 104. Cord 310 can be twisted along the entire length of leash 300 as shown. Alternatively, a portion or portions of cord 310 can be twisted or no portion of cord 310 can be twisted.

A method for making leash 300 can include the following steps: using one continuous piece of cord 310, fold cord 310 in half, create first knot 301 at ring 304 at midpoint, twist the two loose ends of cord 310, feed one end of cord 310 through ring 304 creating second knot 302, continue to twist two loose ends of cord 310, feed one end of cord 310 through the hook 306 creating third knot 303, and connect two ends of cord 310 at joint 305 by any suitable means, for example, using a clamp.

Any of the knots described herein can be any type of knot to secure the respective portions of cord. In some embodiments, a loop-over knot is used (as described above in the method for creating knot 303) which can be advantageous as it distributes the force away from the nearby joint creating a more stable, robust design. In some embodiments, a slip-loop knot is used (as described above in the method for creating knot 202).

Figure 2:
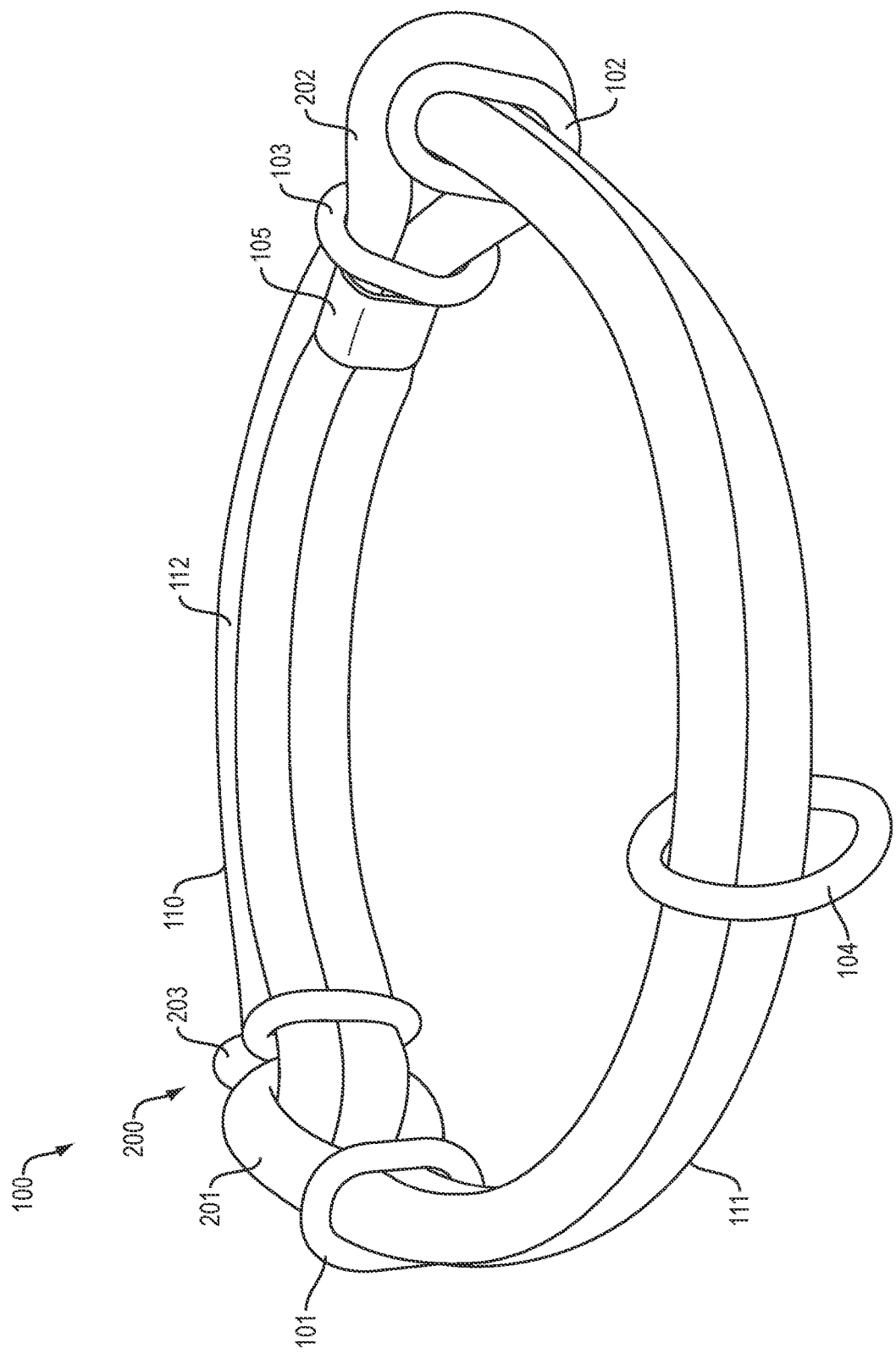
FIG. 2 is a schematic of the collar of FIG. 1 including an adjustor assembly, consistent with the present invention.

FIG. 2 is an alternate view of collar 100 shown in FIG. 1.

Figure 2A:
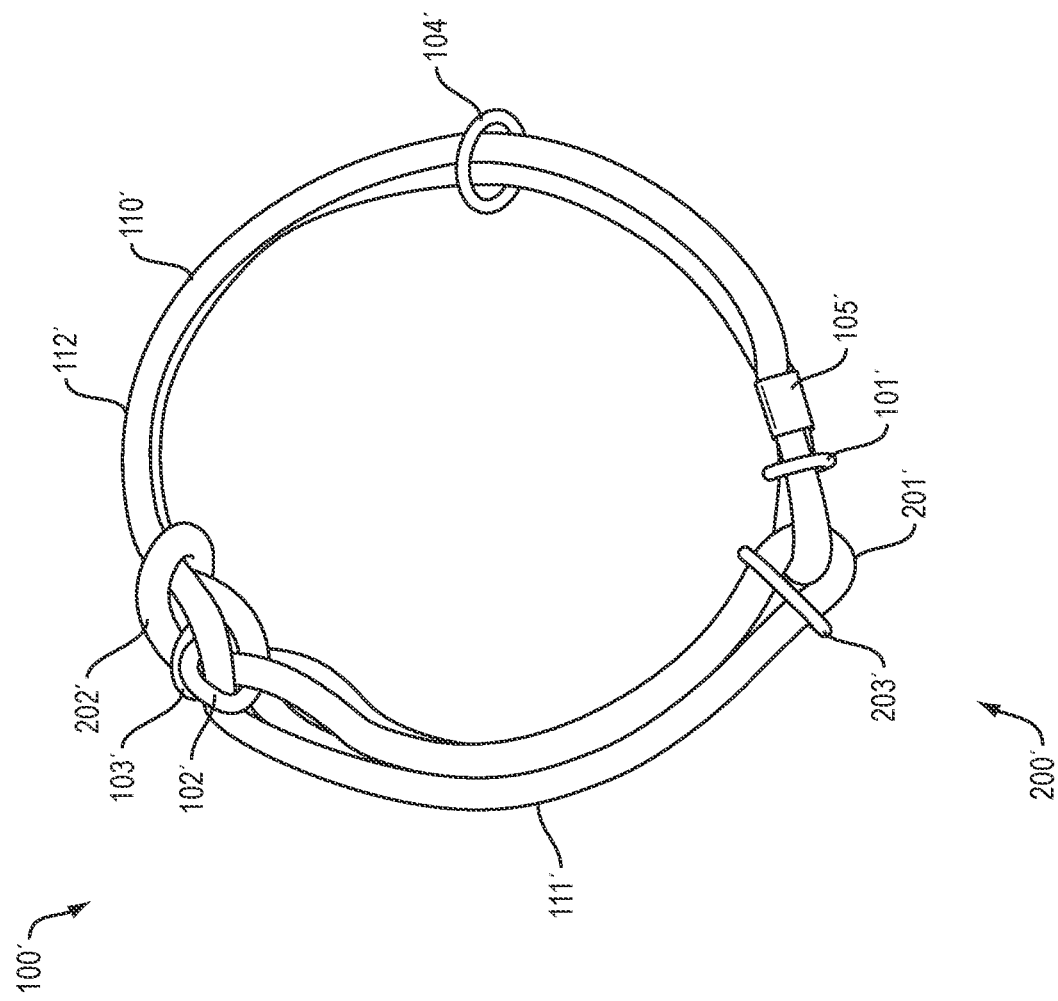
FIG. 2a is a schematic of an alternate collar including an alternate adjustor assembly, consistent with the present invention.

FIG. 2a is a schematic of an alternate collar including an alternate adjustor assembly. In the illustrated embodiment, collar 100' includes continuous cord 110' having joint 105', first ring 101', second ring 102', third ring 103', and fourth ring 104'. First ring 101' is optionally included to secure cord 110' together. Second and third rings 102', 103' can be optionally included to assist a user in adjusting collar 100' size using adjustor assembly 200'. Fourth ring 104' can be used to connect collar 100 to a leash such as leash 300, 300' or 1900 (described herein).

In the illustrated embodiment, collar 100' length or size, specifically its circumference, is adjustable via adjustor assembly 200'. Adjustor assembly 200' includes first knot 201', second knot 202' and double loop ring 203'. To adjust the size of collar 100', double loop ring 203' is moved to an unlocked position by sliding along cord 110' away from first knot 201'. Then, first cord portion 111' can be adjusted relative to second cord portion 112' using rings 102' and 103' until collar 100' is adjusted to the desired size. After collar 100' is adjusted to the desired size, double loop ring 203' is moved to a locked position by sliding along cord 110' toward first knot 201'.

Figure 3:
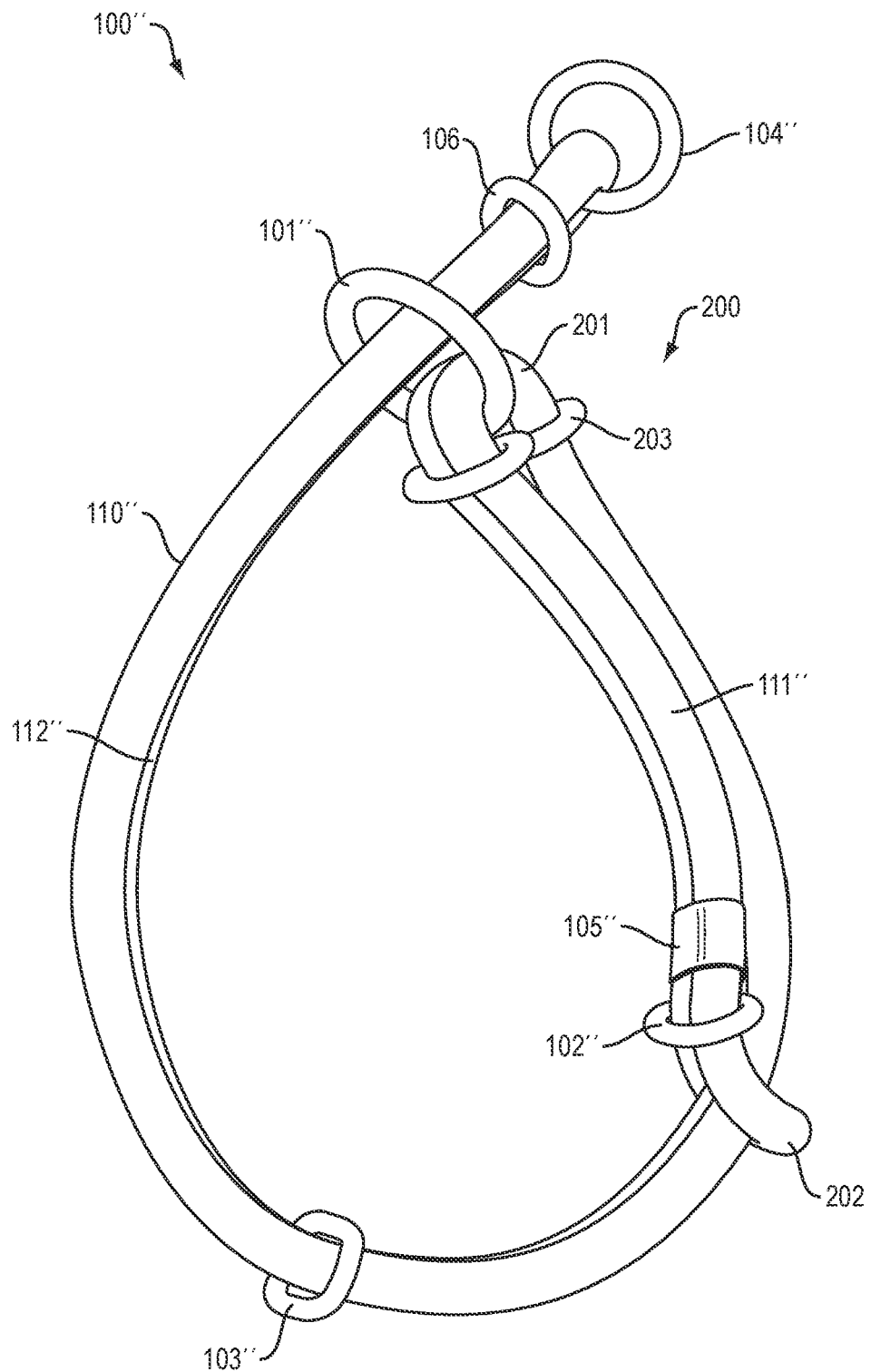
FIG. 3 is a schematic of an alternate collar including the adjustor assembly of FIG. 2, consistent with the present invention.

FIG. 3 is a schematic of an alternate collar including adjustor assembly 200. In the illustrated embodiment, collar 100" includes continuous cord 110" having joint 105", first ring 101", second ring 102", third ring 103", fourth ring 104" and fifth ring 106. Second, third and fifth rings 102", 103", 106 are optionally included to secure cord 110" together. First ring 101" can be included such that end of cord portion 112" can slide through ring 101" allowing the entire collar 100' to tighten around an animal's neck if the animal puts tension on collar 100' and loosens again when tension decreases, sometimes used for training purposes. Fourth ring 104" can be used to connect collar 100" to a leash such as leash 300, 300' or 1900 (described herein).

Figure 4:
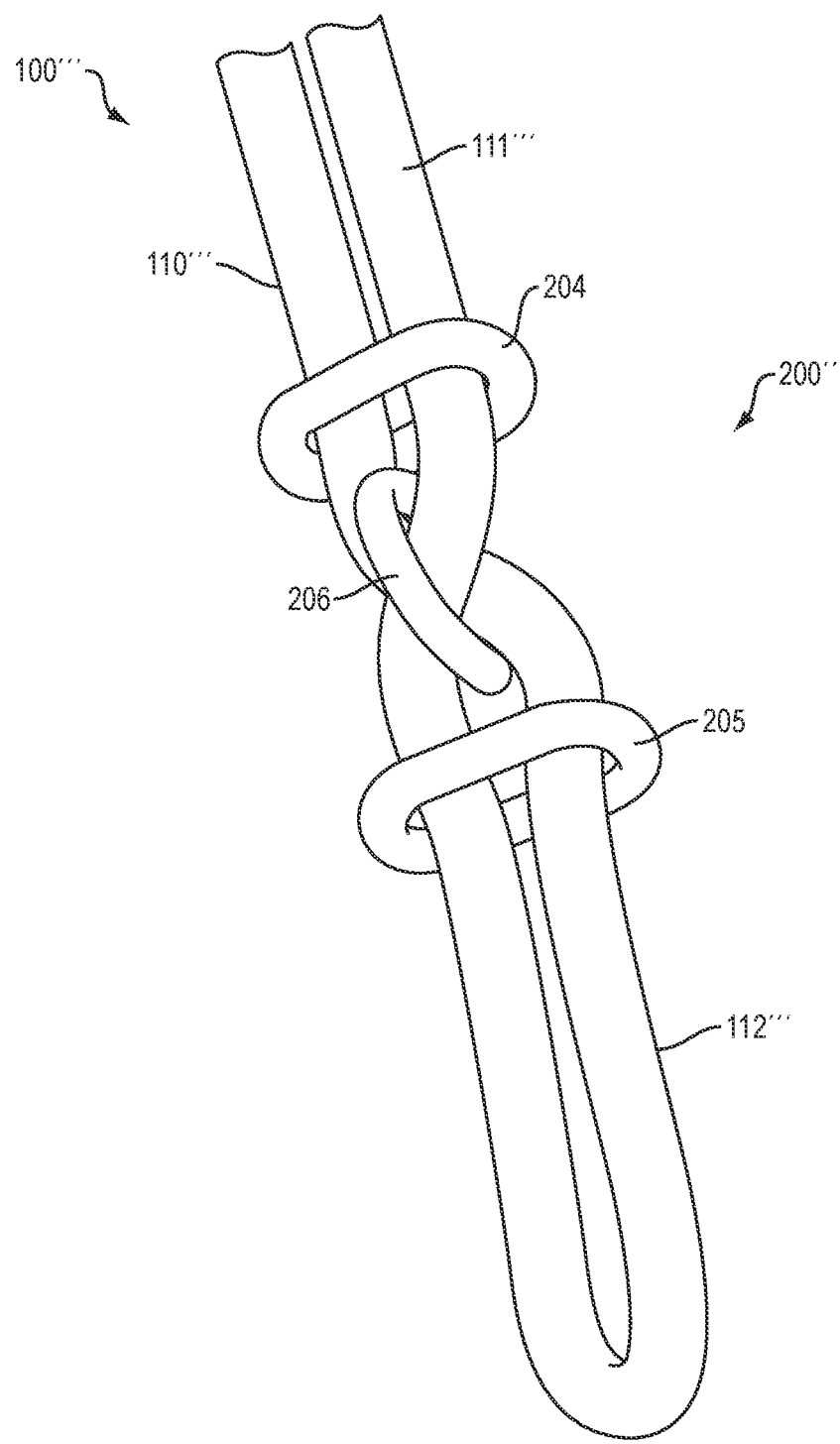
FIG. 4 is a schematic of a collar including an alternate adjustor assembly, consistent with the present invention.

FIG. 4 is a schematic of an alternate collar including an alternate adjustor assembly. In the illustrated embodiment, collar 100'" includes continuous cord 110'" including cord portion 111'" which can connect to a leash and looped cord portion 112'" which can be positioned around an animal's neck. Collar 100'" size is adjustable via adjustor assembly 200'". In the illustrated embodiment, adjustor assembly 200' includes first ring 204, second ring 205 and third ring 206. To adjust the size of collar 100''', first ring 204 and second ring 205 are moved to an unlocked position by sliding along cord 110''' away from third ring 206. Then, third ring 206 slides along cord 110''' towards either first ring 204 or second ring 205 until collar 100''' is adjusted to the desired size. For example, if third ring 206 is moved toward first ring 204, circumference of cord portion 112''' would become larger. After collar 100''' is adjusted to the desired size, first ring 204 and second ring 205 are moved to a locked position by sliding along cord 110''' toward third ring 206. Cord portion 111''' can include the two loose ends of cord where a joint (not shown but such as joint 105 described above) can be created and a ring (not shown but such as ring 104 described above) can be used to connect collar 100''' to a leash such as leash 300, 300' or 1900 (described herein).

Figure 5:
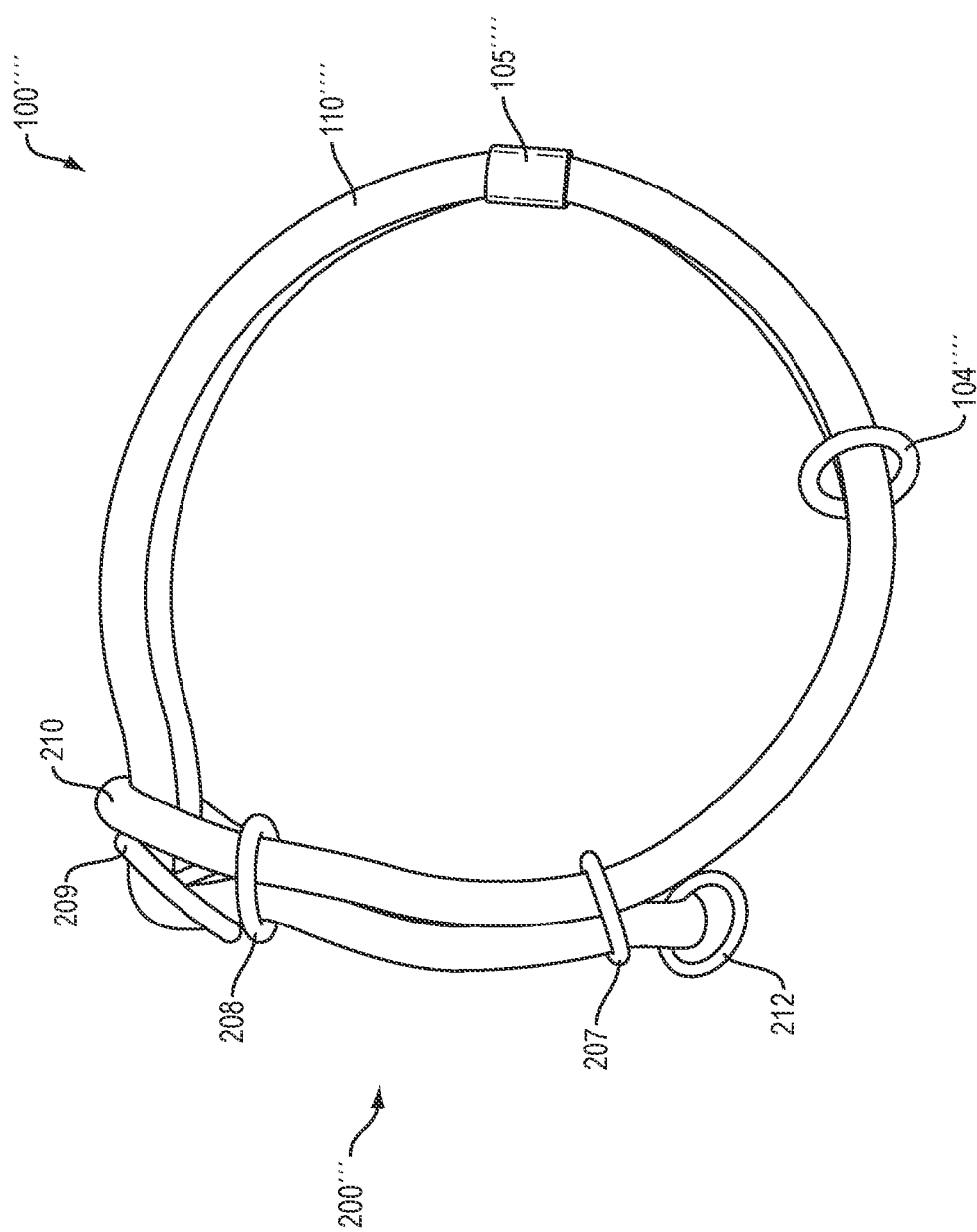
FIG. 5 is a schematic of a collar including an alternate adjustor assembly, consistent with the present invention.

FIG. 5. is a schematic of an alternate collar including an alternate adjustor assembly. In the illustrated embodiment, collar 100'''' includes continuous cord 110'''', joint 105'''' and ring 104''''. Collar 100'''' size is adjustable via adjustor assembly 200'''. In the illustrated embodiment, adjustor assembly 200''' comprises first ring 207, second ring 208, double loop ring 209 and loop 210. To adjust the size of collar 100'''', second ring 208 is moved to an unlocked position by sliding along cord 110'''' toward first ring 207. Then, loop 210 is pulled over ring 209, and a user can pull ring 212 to tighten collar 100''''. After collar 100'''' is adjusted to the desired size, loop 210 is positioned over ring 209 and second ring 208 is moved to a locked position by sliding along cord 110'''' toward ring 209. Ring 104'''' can be used to connect collar 100'''' such as leash 300, 300' or 1900 (described herein).

Figure 5A:
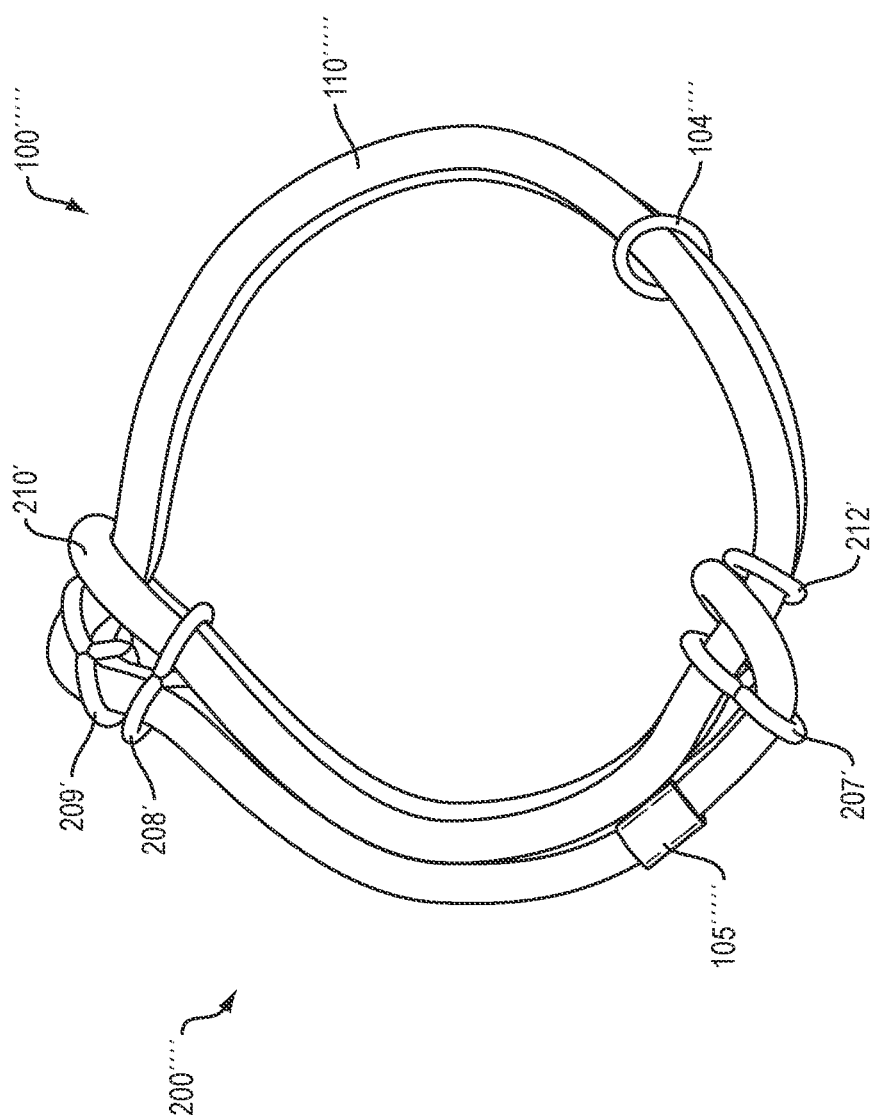
FIG. 5a. is a schematic of an alternate collar including an alternate adjustor assembly, consistent with the present invention.

FIG. 5a. is a schematic of an alternate collar including an alternate adjustor assembly. In the illustrated embodiment, collar 100''''' comprises continuous cord 110''''', joint 105' and ring 104'''''. Collar 100''''' size is adjustable via adjustor assembly 200''''. In the illustrated embodiment, adjustor assembly 200'''' comprises first double loop ring 207', second double loop ring 208', double loop ring 209' and loop 210'. To adjust the size of collar 100''''', second ring 208' is moved to an unlocked position by sliding along cord 110''''' toward first ring 207'. Then, loop 210' is pulled over ring 209', and a user can slide ring 212' along cord 110''''' to adjust collar 100'''''. After collar 100''''' is adjusted to the desired size, loop 210' is positioned over ring 209' and second ring 208' is moved to a locked position by sliding along cord 110''''' toward ring 209'. Ring 104''' can be used to connect collar 100''''' such as leash 300, 300' or 1900 (described herein).

Adjustor assemblies 200, 200', 200'', 200''' and 200'''' can also be used with a harness. FIGS. 6-10 are schematics of various harnesses including adjustor assembly 200.

Figure 6:
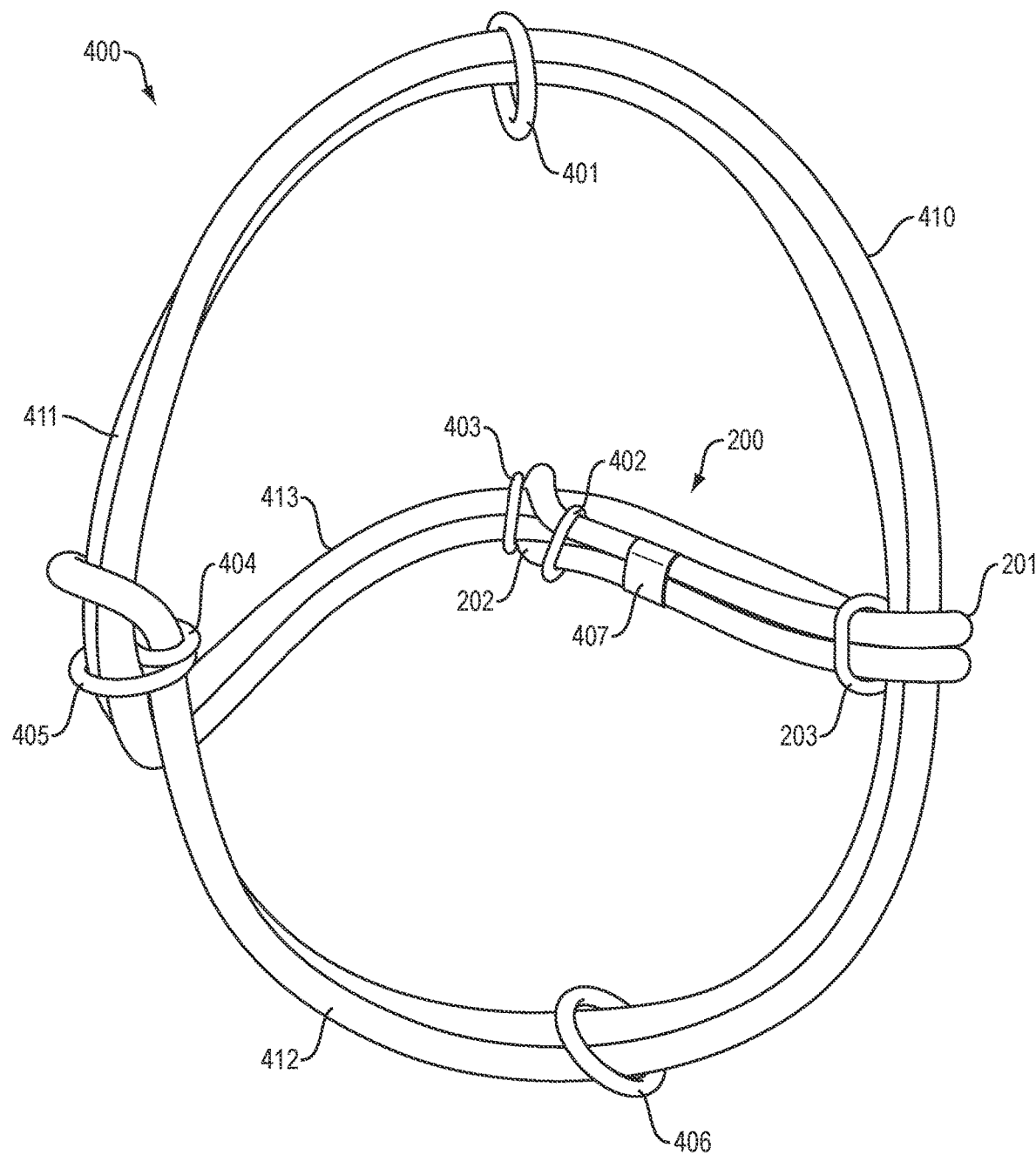
FIG. 6 is a schematic of a harness including the adjustor assembly of FIG. 2, consistent with the present invention.

FIG. 6 is a schematic of harness 400 including adjustor assembly 200. In the illustrated embodiment, harness 400 includes continuous cord 410 having joint 407, first ring 401, second ring 402, third ring 403, fourth ring 404, fifth ring 405 and sixth ring 406. Second, third, fourth and fifth rings 402-405 are optionally included to secure cord 410 together. First and sixth ring 401, 406 can be used to connect harness 400 to a leash such as leash 300. As an example, ring 406 can be used for training purposes such as training a dog on a leash. Harness 400' is configured such that cord portion is 411 positioned around the animal's head around the back of their neck, cord portion 413 is positioned under the animal's lower chest behind the front legs, and cord portion 412 is positioned on the upper chest positioned in front of the front legs.

Figure 7:
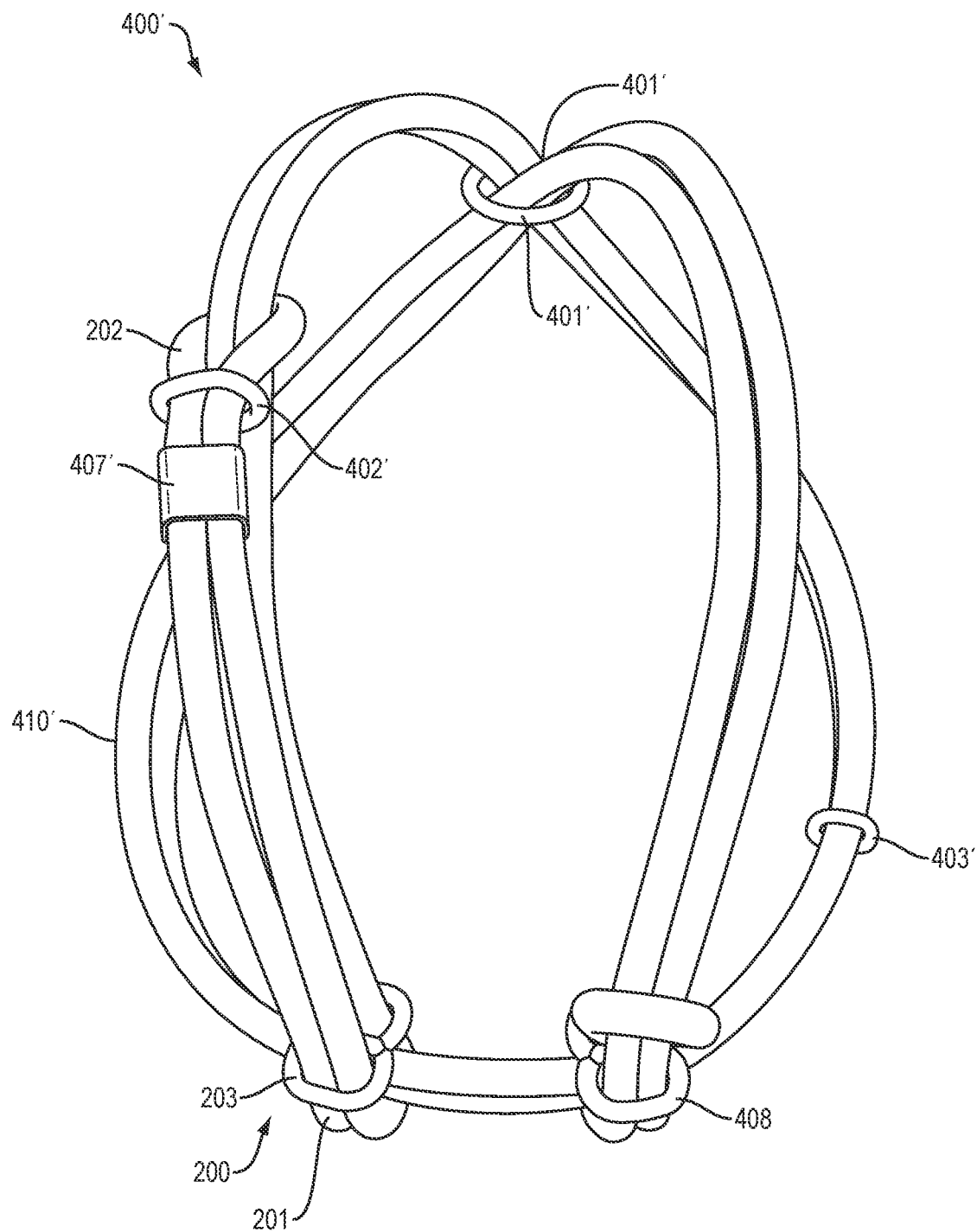
FIG. 7 is a schematic of an alternate harness including the adjustor assembly of FIG. 2, consistent with the present invention.

FIG. 7 is a schematic of harness 400' including adjustor assembly 200. In the illustrated embodiment, harness 400' includes continuous cord 410' having joint 407', first ring 401', second ring 402', third ring 403' and double loop ring 408. Second and third rings 402', 403' are optionally included to secure cord 410' together. Fewer or additional rings configured to secure cord together are contemplated. Double loop ring 408 is optionally included to maintain the lower portion of harness 400' low on the animal's chest and away from the animal's neck. First ring 401' can be used to connect harness 400' to a leash such as leash 300, 300', 1900 (described herein). Harness 400' is configured to be a cross body harness.

Figure 8:
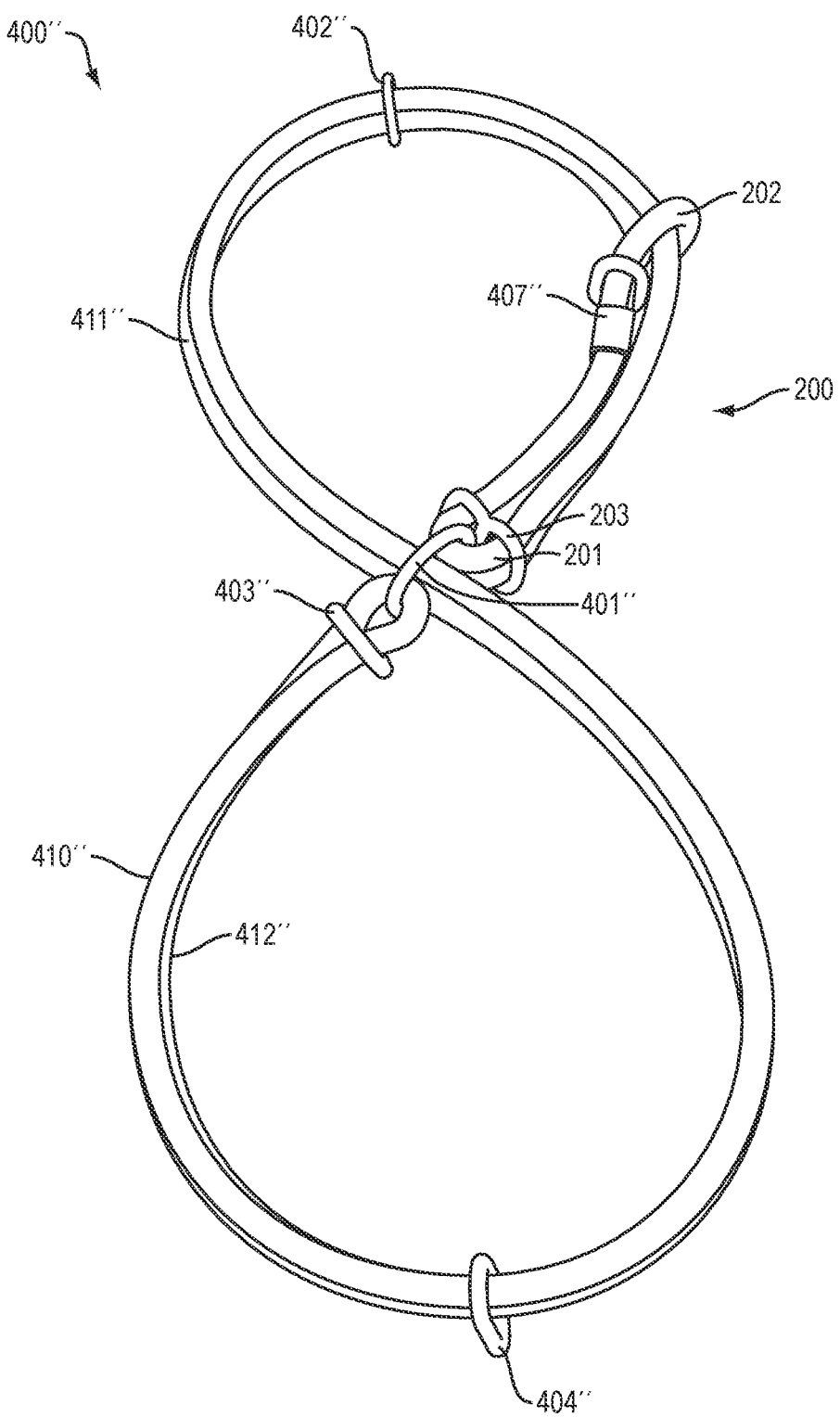
FIG. 8 is a schematic of an alternate harness including the adjustor assembly of FIG. 2, consistent with the present invention.

FIG. 8 is a schematic of harness 400'' including adjustor assembly 200. In the illustrated embodiment, harness 400'' includes continuous cord 410'' having joint 407'', first ring 401'', second ring 402'', third ring 403'' and fourth ring 404''. Second, third and fourth rings 402'-404' are optionally included to secure cord 410'' together. First ring 401'' can be used to connect harness 400'' to a leash such as leash 300, 300' or 1900 (described herein). Harness 400'' is configured such that cord portion 411'' is similar to a collar, and cord portion 412'' is positioned around the animal's body.

Figure 9:
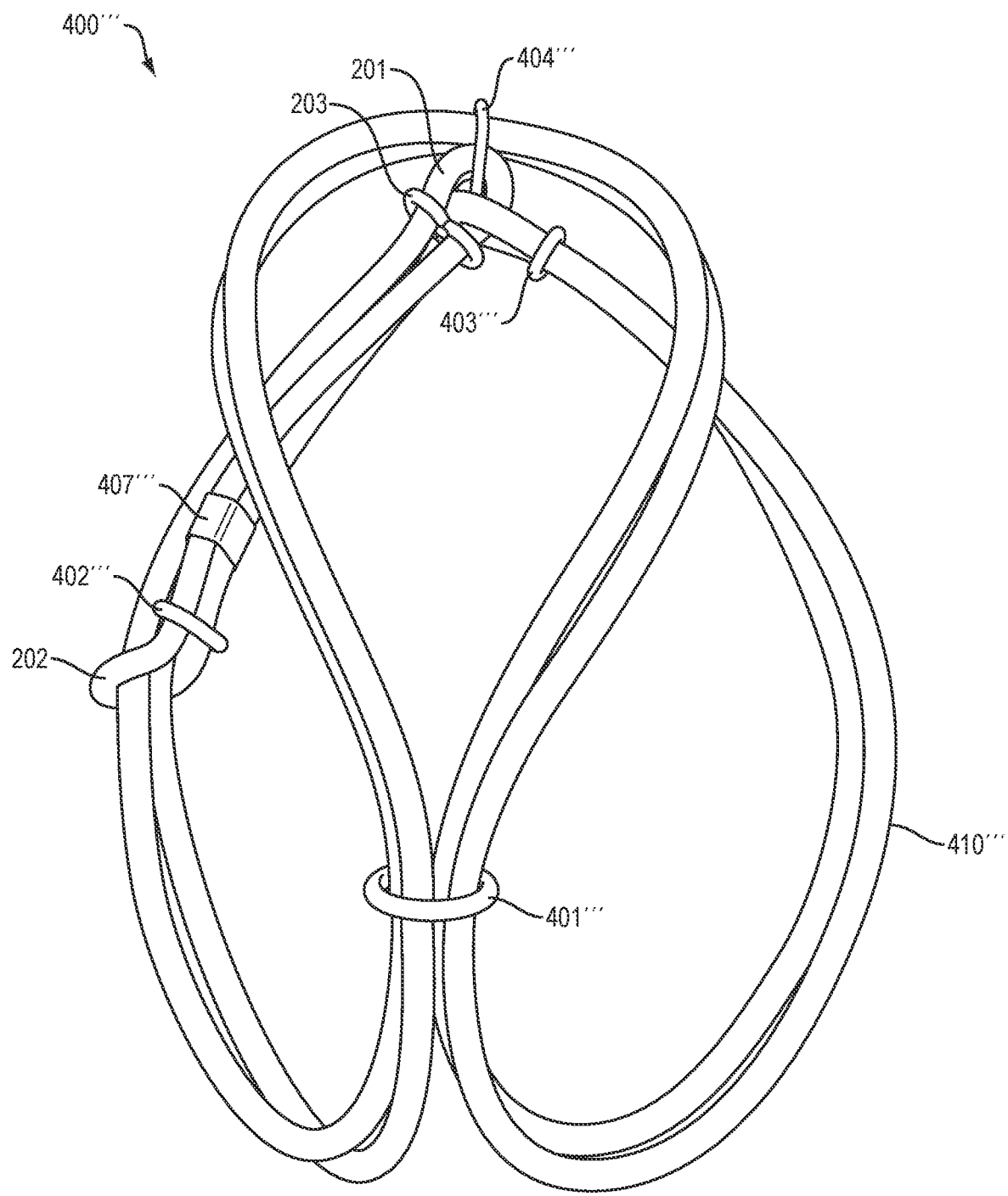
FIG. 9 is a schematic of an alternate harness including the adjustor assembly of FIG. 2, consistent with the present invention.

FIG. 9 is a schematic of harness 400''' including adjustor assembly 200. In the illustrated embodiment, harness 400''' includes continuous cord 410''' having joint 407''', first ring 401''', second ring 402''', third ring 403''' and fourth ring 404'''. Second and third rings 402''', 403''' are optionally included to secure cord 410''' together. Fourth ring 404''' is optionally included to maintain the lower portion of harness 400' low on the animal's chest and away from the animal's neck. First ring 401''' can be used to connect harness 400''' to a leash such as leash 300, 300' or 1900 (described herein). Harness 400''' is configured to be a cross body harness similar to harness 400' in FIG. 7.

Figure 10:
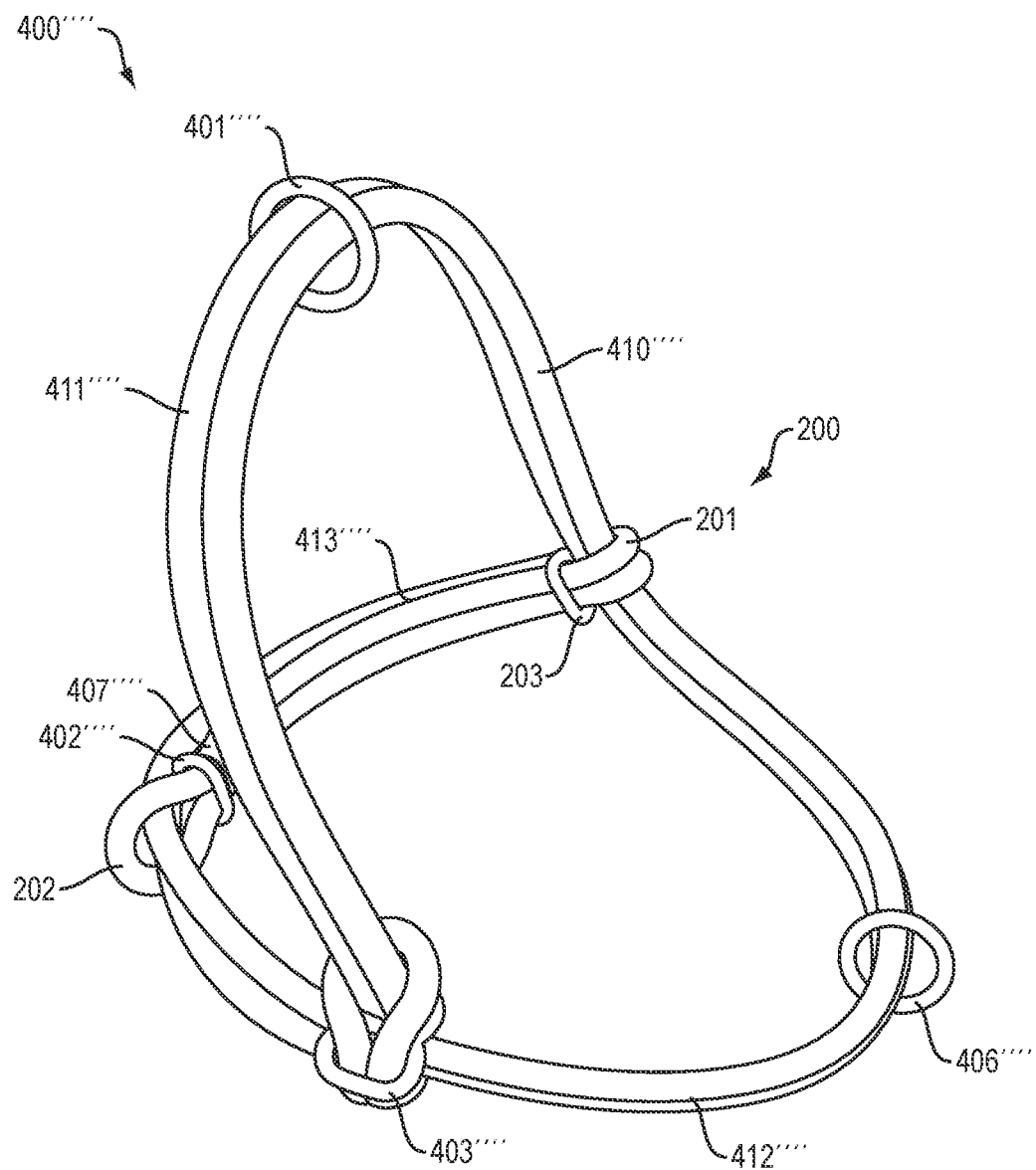
FIG. 10 is a schematic of an alternate harness including the adjustor assembly of FIG. 2, consistent with the present invention.

FIG. 10 is a schematic of harness 400'''' including adjustor assembly 200. In the illustrated embodiment, harness 400'''' includes continuous cord 410'''' having joint 407'''', first ring 401'''', second ring 402'''', third ring 403'''', and fourth ring 406''''. Second and third rings, 402'''', 403'''' are optionally included to secure cord 410 together. First and sixth ring 401'''', 406'''' can be used to connect harness 400 to a leash such as leash 300. As an example, ring 406'''' can be used for training purposes such as training a dog on a leash. Harness 400'''' is configured such that cord portion is 411'''' positioned around the animal's head around the back of their neck, cord portion 413'''' is positioned under the animal's lower chest behind the front legs, and cord portion 412'''' is positioned on the upper chest positioned in front of the front legs.

Figure 11:
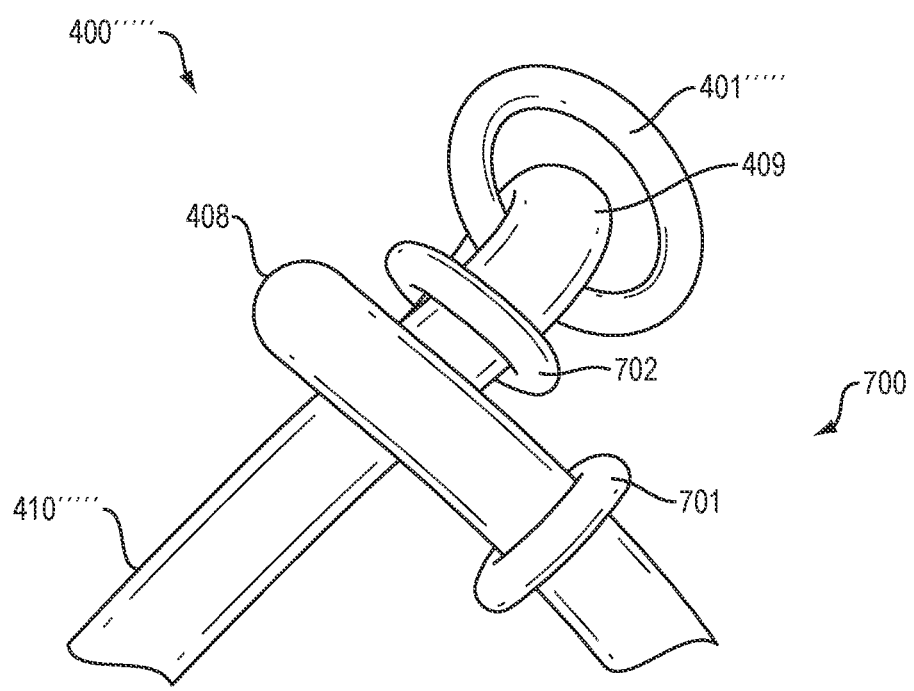
FIG. 11 is a schematic of an alternate harness including a connector, consistent with the present invention.

The harnesses illustrated in FIGS. 6-10 are configured using a continuous cord. Optionally, any harness used with system 10, as those illustrated in FIGS. 6-10, can be configured from a cord that is not continuous and instead a cord having two ends to be connected via a connector such as the connector shown in FIG. 11. For example, FIG. 11 is a schematic of harness 400''''' including connector 700. In the illustrated embodiment, harness 400''''' includes cord 410''''' having first looped end 408, second looped end 409, and ring 401'''''. Ring 401''''' can be configured to attached harness 400''''' to a leash, such as leash 300, 300' or 1900 (described herein). First and second looped ends 408, 409 can be connected together via connector 700. Connector 700 includes first ring 701 and second ring 702. For example, ring 401''''' can be fed through first looped end 408 and secured in position via rings 701, 702.

The harnesses illustrated in FIGS. 6-10 include adjustor assembly 200. Optionally, any harness used with system 10, such as those illustrated in FIGS. 6-10, can include adjustor assembly 200', 200'', 1720 or 1820.

Figure 12:
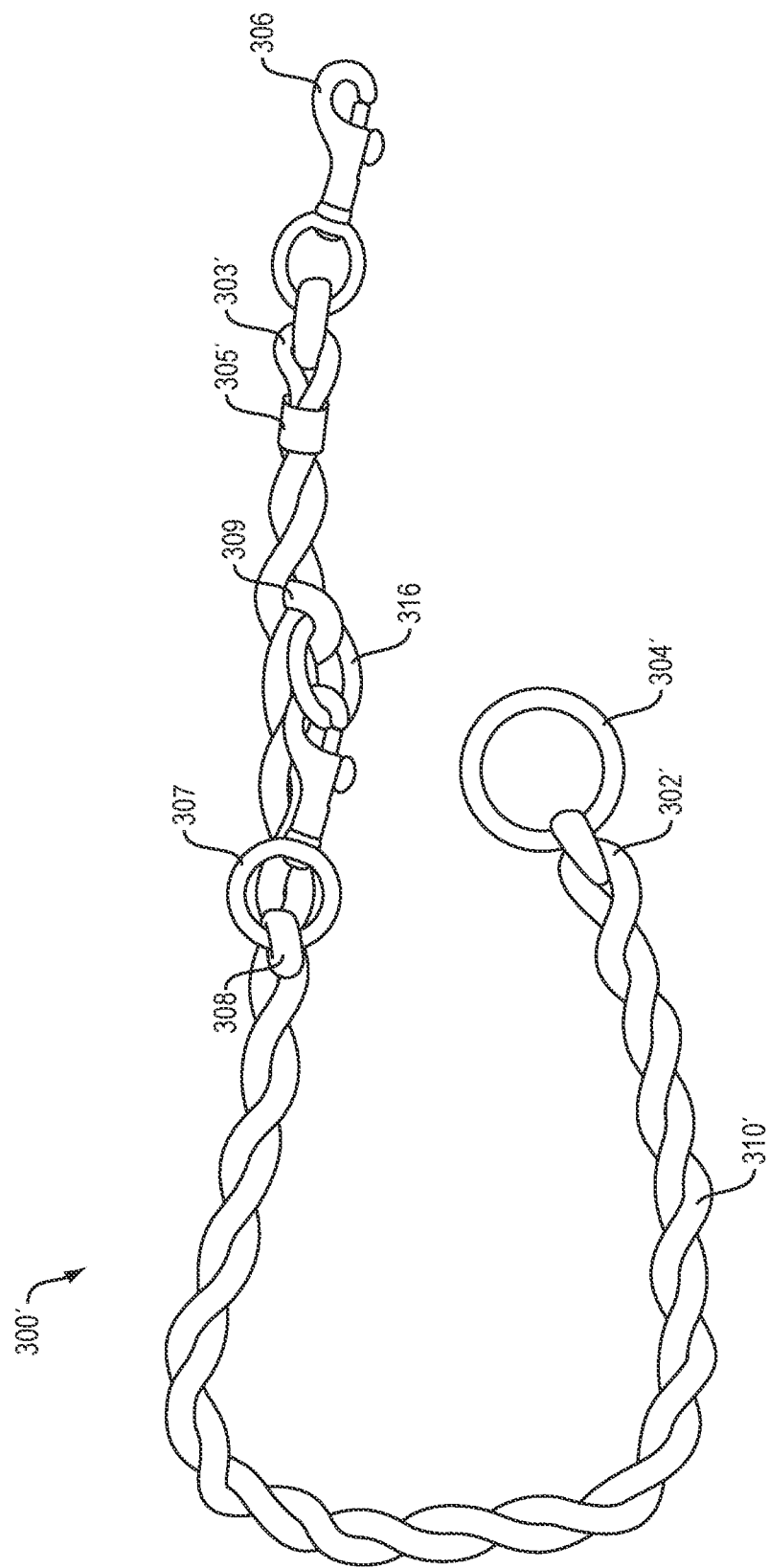
FIG. 12 is a schematic of a leash having a modular design, consistent with the present invention.

FIG. 12 is a schematic of a leash having a modular design. Leash 300' includes continuous cord 310' comprising joint 305', knot 302', knot 303', first ring 304', second ring 316, and hook 306'. Cord 310' can be twisted along the entire length of leash 300' as shown. Alternatively, a portion or portions of cord 310' can be twisted or no portion of cord 310' can be twisted. In the illustrated embodiment, leash 300' includes knot 303' to secure hook 306' to leash 300'. In other embodiments (not shown), leash 300' (or leash 300) can include a double loop ring to secure hook 306'.

A leash can optionally include a hook to shorten the leash and create a handle. For example, as shown in FIG. 12, hook 307 is secured to leash 300' via knot 308 and ring 316, and ring 316 is secured to leash 300' via knot 309. Hook 307 can be disconnected from ring 316 and can be used to connect to ring 304' to shorten leash 300' and create a handle (not shown). Hook 307 can be secured to leash 300' via any suitable means.

Figure 12A:
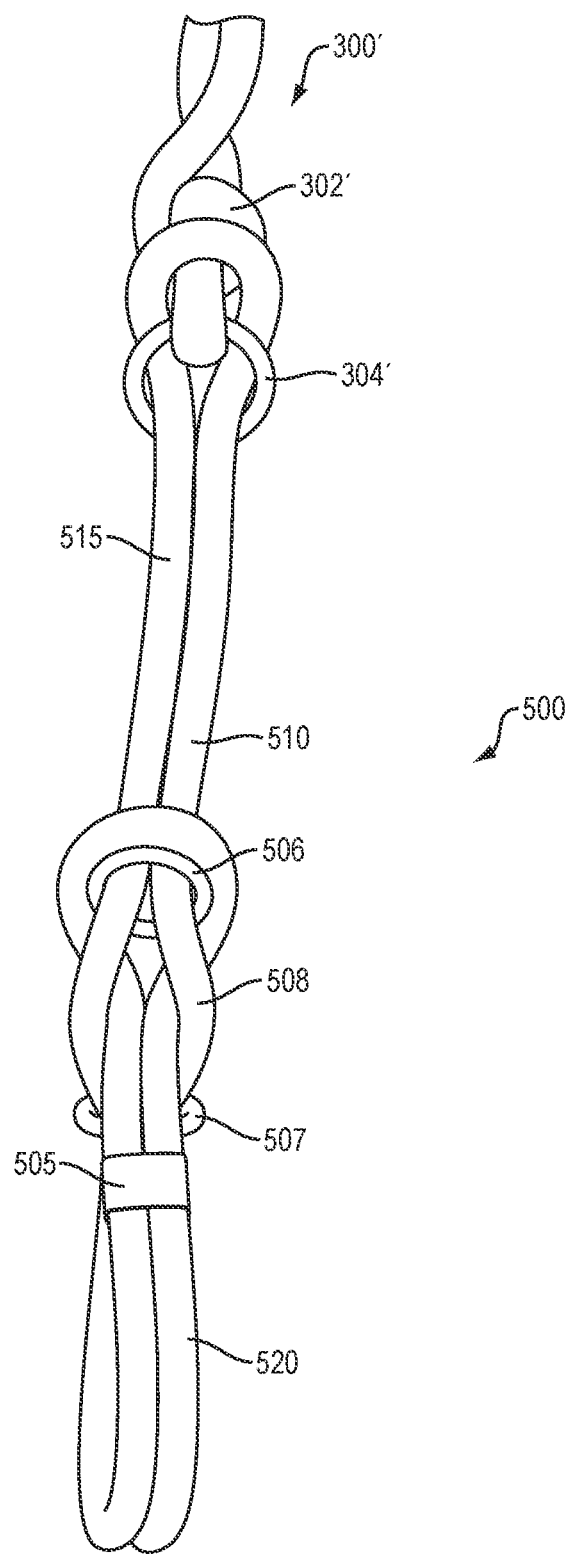
FIG. 12a is a schematic of a handle that can be used with the leash of FIG. 10, consistent with the present invention.
Figure 12B:
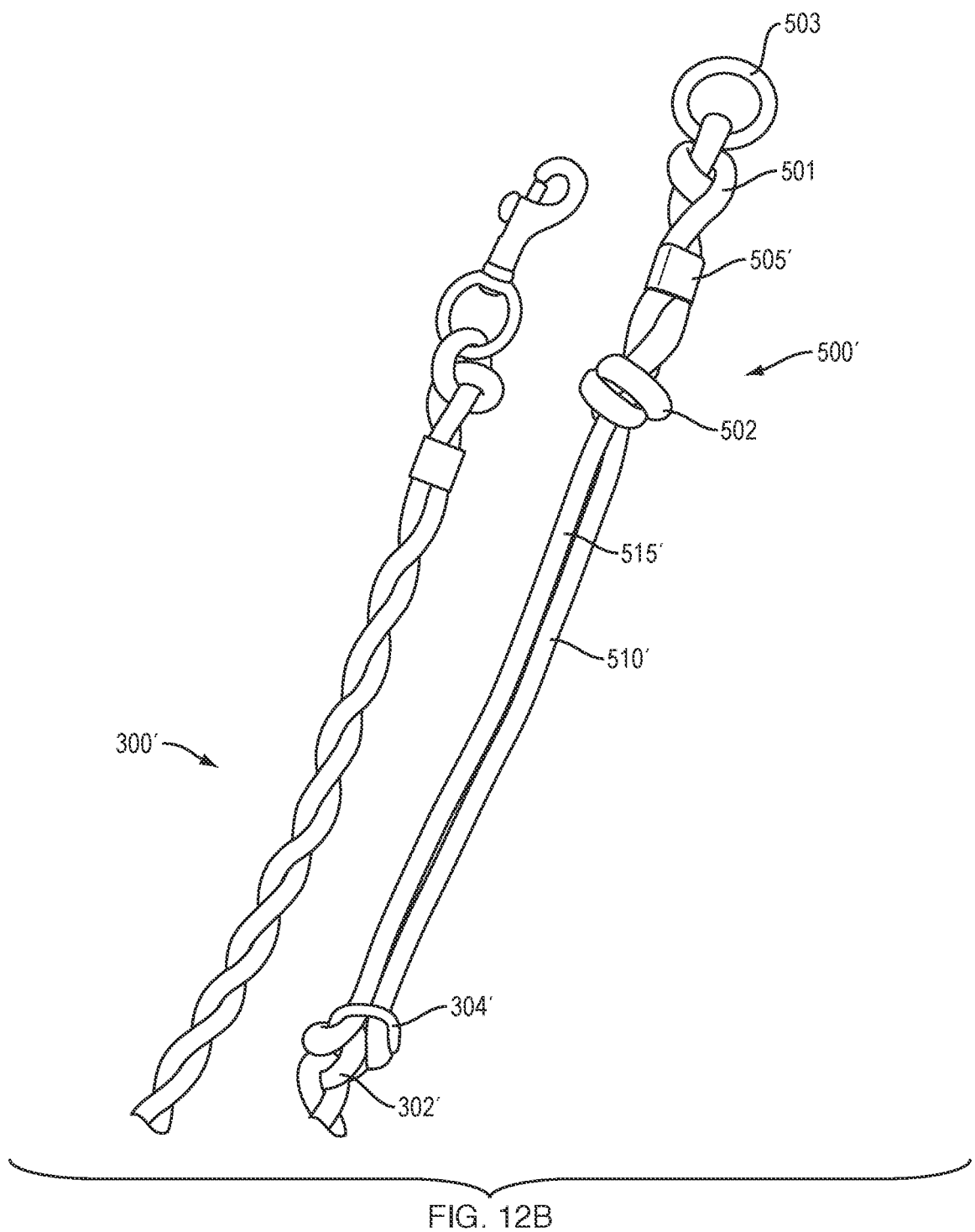
FIG. 12b is a schematic of an alternate handle that can be used with the leash of FIG. 10, consistent with the present invention.

Alternative to creating a handle via hook 307 and ring 304', any type of modular handle can be used with leash 300', for example handles 500 and 500' illustrated in FIGS. 12a and 12b. Handle 500 comprises continuous cord 510, joint 505, first ring 506, second ring 507, knot 508, first looped end 515 and second looped end 520. Handle 500 attaches to leash 300' by feeding looped end 515 through ring 304' and pulling handle 500 through ring 304'. Looped end 520 can be used to hold handle 500 and is size adjustable via rings 506, 507 and knot 508. For example, looped end 520 can be adjusted to a smaller size by moving rings 506, 507 toward looped end 520 relative to knot 508. Adjustor assembly 200' can also be used to adjust the size of looped end 520.

Handle 500' comprises continuous cord 510', joint 505', first knot 501, second knot 502 and ring 503. User can hold ring 503 or looped end 515'. Handle 500' attaches to leash 300' by feeding looped end 515' through ring 304' and pulling handle 500' through ring 304'.

Leash 300' and handles 500 and 500' can be of any length depending on the size of the animal and desired use.

Figure 13:
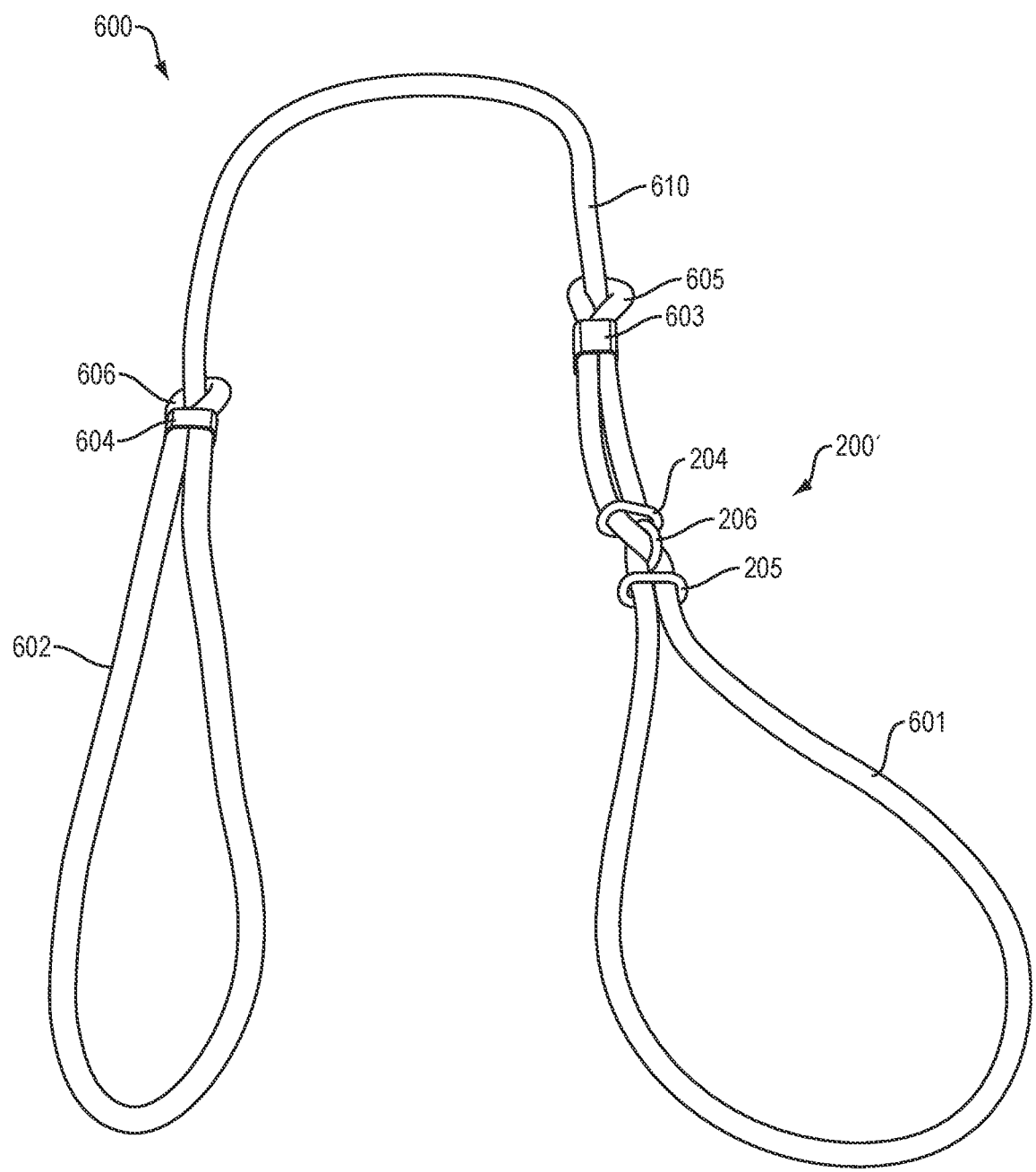
FIG. 13 is a schematic of a device for restraining an animal, consistent with the present invention.

FIG. 13 is a schematic of device 600 for restraining an animal including adjustor assembly 200'. Device 600 includes continuous cord 610, collar 601 adjustable via adjustor assembly 200', handle 602, joints 603, 604 and knots 605, 606. In some embodiments, handle 602 can be adjustable via adjustor assembly 200'. In some embodiments, device 600 can alternatively include adjustor assembly 200 or 200''.

Figure 14:
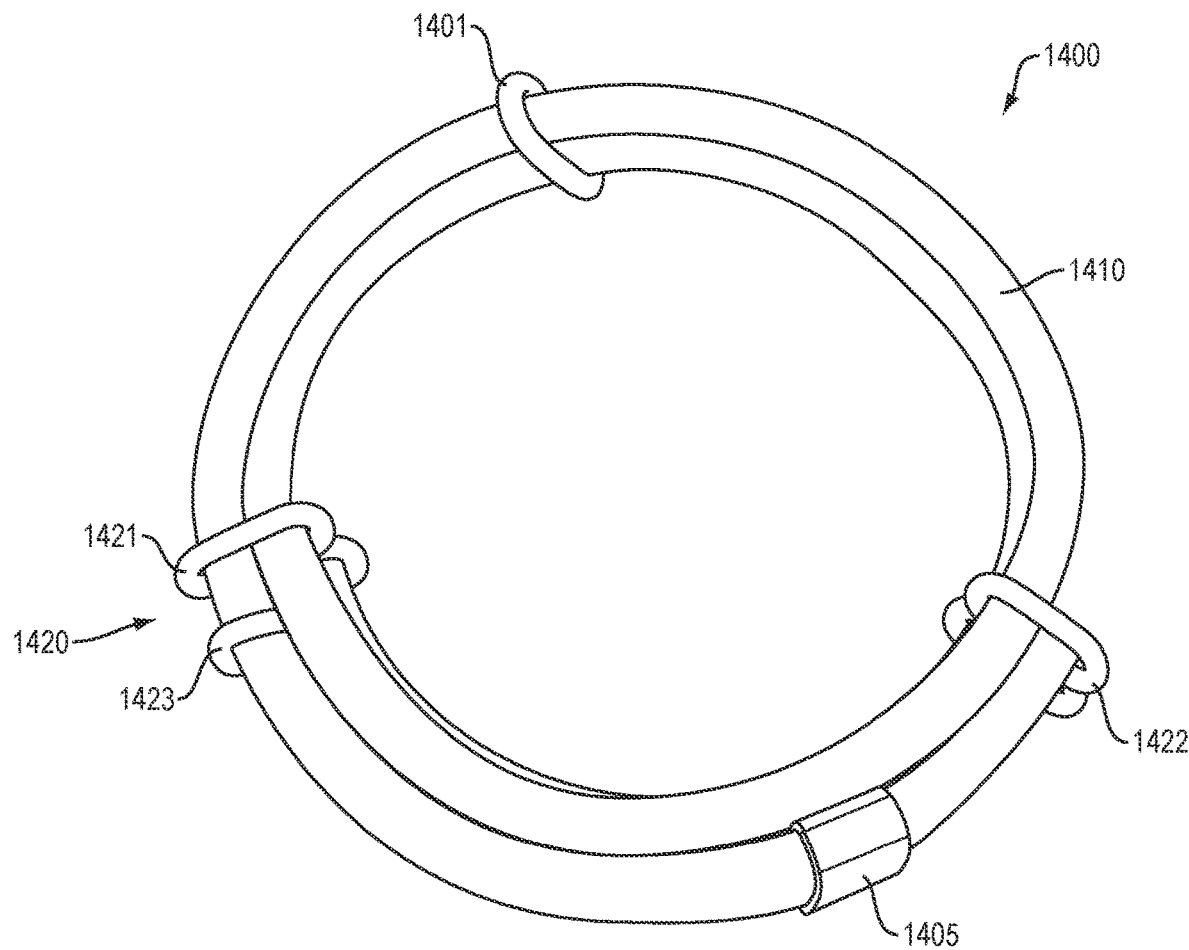
FIG. 14 is a schematic of a collar including an adjustor assembly, consistent with the present invention.

FIG. 14 is a schematic of a collar including an adjustor assembly. In the illustrated embodiment, collar 1400 includes continuous cord 1410 secured by joint 1405, and first ring 1401. First ring 1401 can be used to connect collar 1400 to a leash such as leash 300, 300' or 1900 (described herein). In the illustrated embodiment, collar 1400 length or size, specifically its circumference, is adjustable via adjustor assembly 1420. Adjustor assembly 1420 includes adjustor rings 1421 and 1422 and locking ring 1423. In some aspects, adjustor rings 1421 and 1422 comprise double loop rings and locking ring 1423 comprises a single loop ring. To adjust the size of collar 1400, locking ring 1423 is moved to an unlocked position by moving ring locking 1423 away from adjustor ring 1421, then adjustor rings 1421 and 1422 are moved by sliding along cord 1410 until collar 1400 is adjusted to the desired size (direction depending on desire to increase or decrease the size of collar 1400). After collar 1400 is adjusted to the desired size, locking ring 1423 is moved to a locked position by sliding along cord 1410 toward adjustor ring 1421 to a position proximate to adjustor ring 1421.

A method of making collar 1400 starting from a single cord 1410 includes folding the cord 1410 in half forming two loose ends and a folded end; sliding adjustor ring 1421, e.g., a double looped ring along the cord via the two loose ends of the cord towards the folded end, securing tightly; sliding an adjustor ring 1422, e.g., a double loop ring, along the cord via the two loose ends of the cord towards the folded end; sliding a first ring 1401 along the cord via the two loose ends of the cord; feeding the two loose ends through the first adjustor ring that is positioned at the folded end of the cord; sliding a locking ring 1423, e.g., a single loop ring, over the two loose ends of the cord; feeding one of the loose ends of the cord through one ring of the second adjustor ring and back through the second ring of the adjustor ring from the opposite direction; adjusting the size of the collar; trimming both loose ends such they are the same length; stitching the two loose ends together, for example, with nylon waxed heavy gage thread; and securing the joint, for example, with a clamp.

Figure 15:
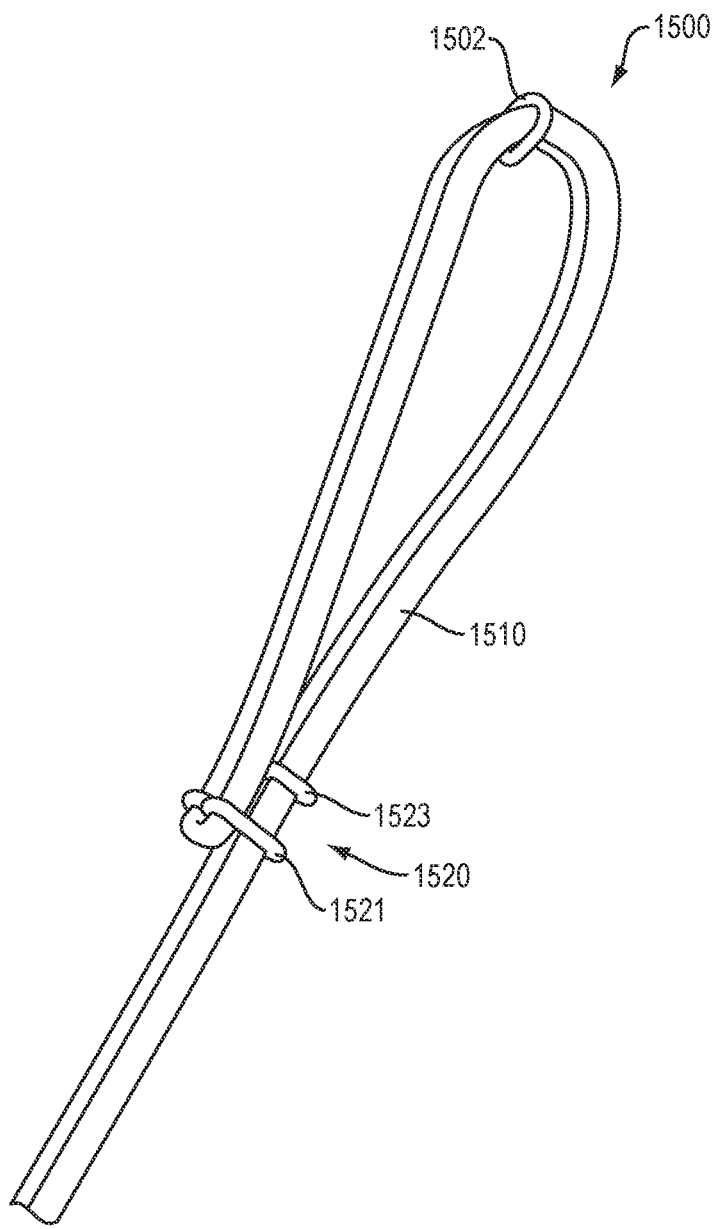
FIG. 15 is a schematic of a collar including an adjustor assembly, consistent with the present invention.

FIG. 15 is a schematic of a collar including an adjustor assembly. Collar 1500 comprises continuous cord 1510, first ring (not shown) and optional second ring 1502. First ring (not shown) can be used to connect collar 1500 to a leash such as leash 300, 300' or 1900 (described herein). Alternatively, collar 1500 can include leash via a continuous cord 1510. Optional second ring 1502 can be used to secure cord 1510 together. In the illustrated embodiment, collar 1500 length or size, specifically its circumference, is adjustable via adjustor assembly 1520. Adjustor assembly 1520 includes adjustor ring 1521 and locking ring 1523. In some aspects, adjustor ring 1521 comprises a double loop ring and locking ring 1523 comprises a single loop ring. To adjust the size of collar 1500, locking ring 1523 is moved to an unlocked position by moving locking ring 1523 away from adjustor ring 1521, then adjustor ring 1521 is moved by sliding along cord 1510 until collar 1500 is adjusted to the desired size (direction depending on desire to increase or decrease the size of collar 1500). After collar 1500 is adjusted to the desired size, locking ring 1523 is moved to a locked position by sliding toward adjustor ring 1521 to a position proximate to adjustor ring 1521.

A method of making collar 1500 starting from a single cord 1510 includes folding the cord 1510 in half forming two loose ends and a folded end; sliding a first ring along the cord via the two loose ends of the cord towards the folded end; sliding a locking ling 1523, e.g., a single looped ring along the cord via the two loose ends of the cord towards the folded end, securing tightly; sliding an adjustor ring 1522, e.g., a double loop ring, along the cord via the two loose ends of the cord towards the folded end; sliding two locking rings, e.g., a single looped ring along the cord via the two loose ends of the cord towards the folded end; feeding one of the loose ends of the cord through one ring of the adjustor ring and back through the second ring of the adjustor ring from the opposite direction; adjusting the size of the collar; trimming both loose ends such they are the same length; stitching the two loose ends together, for example, with nylon waxed heavy gage thread; and securing the joint, for example, with a clamp.

A alternative method of making collar 1500 starting from a single cord 1510 includes folding the cord 1510 in half forming two loose ends and a folded end; sliding a first ring along the cord via the two loose ends of the cord towards the folded end; sliding a locking ring 1523, e.g., a single looped ring along the cord via the two loose ends of the cord towards the folded end, securing tightly; sliding an adjustor ring 1522, e.g., a double loop ring; along the cord via the two loose ends of the cord towards the folded end; sliding two locking rings, e.g., a single looped ring along the cord via the two loose ends of the cord towards the folded end; feeding one of the loose ends of the cord through one ring of the adjustor ring, loop the same loose end around the cord and back through the second ring of the adjustor ring from the opposite direction; adjusting the size of the collar; trimming both loose ends such they are the same length; stitching the two loose ends together, for example, with nylon waxed heavy gage thread; and securing the joint, for example, with a clamp.

Figure 16:
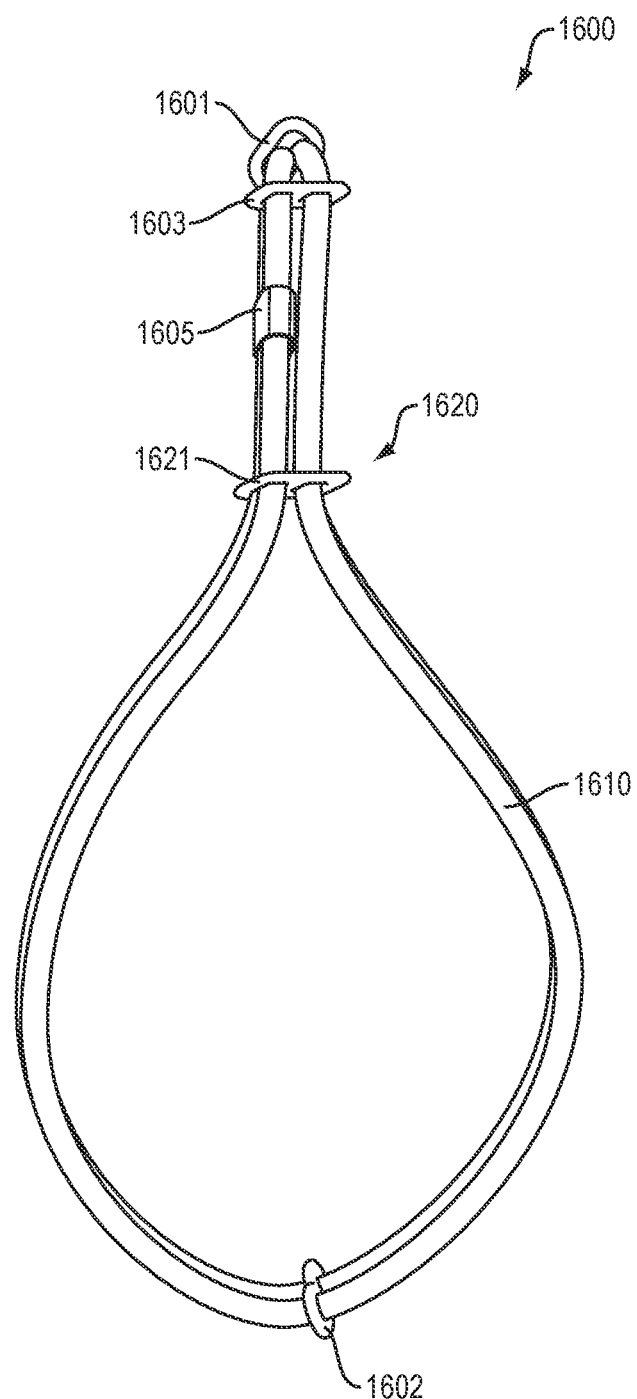
FIG. 16 is a schematic of a collar including an adjustor assembly, consistent with the present invention.

FIG. 16 is a schematic of a collar including an adjustor assembly. Collar 1600 comprises continuous cord 1610, first ring 1601 and second ring 1602. First ring 1601 can be used to connect collar 1600 to a leash such as leash 300, 300' or 1900 (described herein). In the illustrated embodiment, collar 1600 length or size, specifically its circumference, is adjustable via adjustor assembly 1620. Adjustor assembly 1620 includes adjustor ring 1621. In some aspects, adjustor ring 1621 comprises a double loop ring. To adjust the size of collar 1600, adjustor ring 1621 is moved by sliding along cord 1610 until collar 1600 is adjusted to the desired size (direction depending on desire to increase or decrease the size of collar 1600). In this embodiment, a locking ring is not required to maintain the position of adjustor ring 1621.

Figure 17:
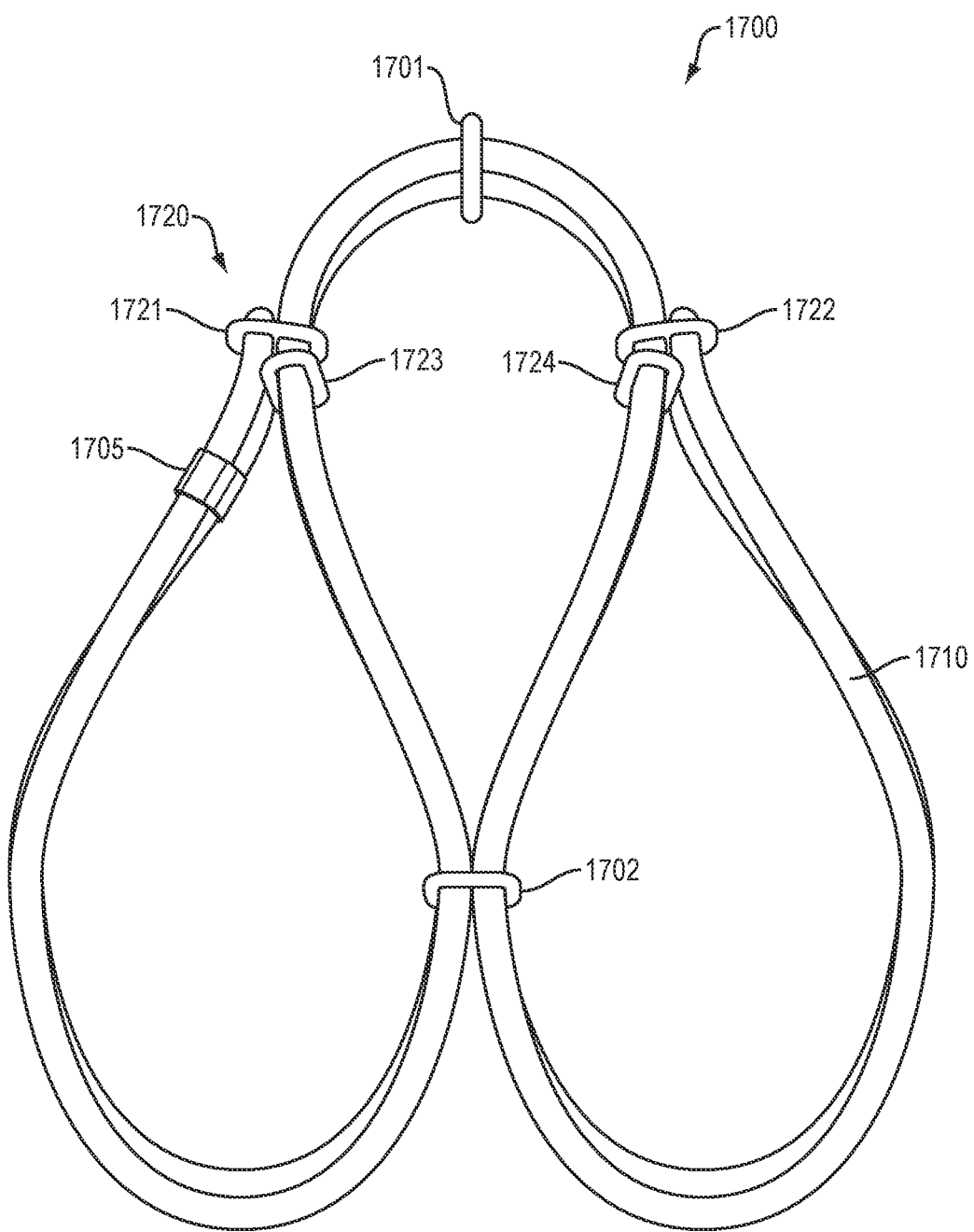
FIG. 17 is a schematic of a harness including an adjustor assembly, consistent with the present invention.

FIG. 17 is a schematic of harness 1700 including adjustor assembly 1720. In the illustrated embodiment, harness 1700 includes continuous cord 1710 secured by joint 1705, first ring 1701 and second ring 1702. First ring 1701 can be used to connect harness 1700 to a leash such as leash 300, 300' or 1900 (described herein). Second ring 1702 can be used to secure portions of cord 1710 together, for example, to create three spaces, one for each an animal's head and two front feet. Adjustor assembly 1720 includes adjustor rings 1721 and 1722 and locking ring 1723. In some aspects, adjustor rings 1721 and 1722 comprise a double loop ring and locking ring 1723 comprises a single loop ring. To adjust the size of harness 1700, locking ring 1723 is moved to an unlocked position by moving locking ring 1723 away from adjustor ring 1721, and locking ring 1724 is moved to an unlocked position by moving locking ring 1724 away from adjustor ring 1722, then adjustor rings 1721 and 1722 are moved by sliding along cord 1710 until the three spaces of harness 1700 are adjusted to the desired size. After harness 1700 is adjusted to the desired size, locking ring 1723 is moved to a locked position by sliding toward adjustor ring 1721 to a position proximate to adjustor ring 1721 and locking ring 1724 is moved to a locked position by sliding toward adjustor ring 1722 to a position proximate to adjustor ring 1722.

A method of making harness 1700 starting from a single cord 1710 includes folding the cord in half forming two loose ends and a folded end; sliding an adjustor ring 1721 or 1722, a double loop ring, along the cord via the two loose ends of the cord towards the folded end, securing tight; sliding a first ring 1701 along the cord via the two loose ends of the cord; sliding a locking ring 1723 or 1724, a single loop ring, over the two loose ends of the cord; feeding the two loose ends through the first adjustor ring that is positioned at the folded end of the cord; sliding a second ring 1702 along the cord via the two loose ends of the cord; sliding an adjustor ring 1722 or 1721, e.g., a double looped ring along the cord via the two loose ends of the cord towards the folded end; sliding a locking ring 1724 or 1723 over the two loose ends of the cord; feeding the two loose ends of the cord back through the first ting; feeding one of the loose ends of the cord through one ring of the second adjustor ring and back through the second ring of the adjustor ring from the opposite direction; adjusting the size of the harness; trimming both loose ends such they are the same length; stitching the two loose ends together, for example, with nylon waxed heavy gage thread; and securing the joint, for example, with a clamp.

Figure 18:
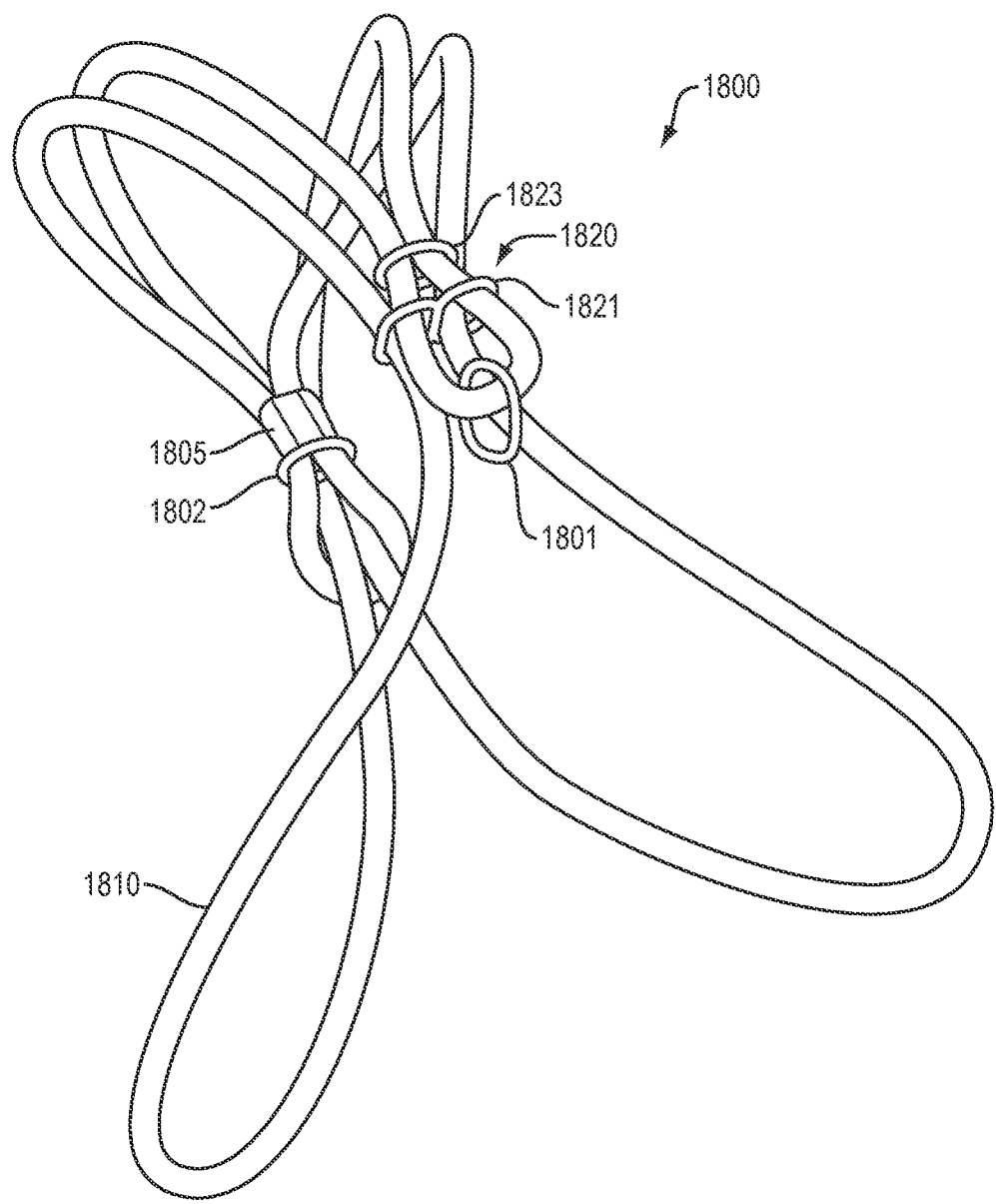
FIG. 18 is a schematic of a harness including an adjustor assembly, consistent with the present invention.

FIG. 18 is a schematic of harness 1800 including adjustor assembly 1820. In the illustrated embodiment, harness 1800 includes continuous cord 1810 secured by joint 1805, first ring 1801 and second ring 1802. First ring 1801 can be used to connect harness 1800 to a leash such as leash 300, 300' or 1900 (described herein). Second ring 1802 can be used to secure portions of cord 1810 together. Adjustor assembly 1820 includes adjustor ring 1821 and locking ring 1823. In some aspects, adjustor ring 1821 comprises a double loop ring and locking ring 1823 comprises a single loop ring. To adjust the size of harness 1800, locking ring 1823 is moved to an unlocked position by moving ring 1823 away from adjustor ring 1821, then adjustor ring 1821 is moved by sliding along cord 1810 until harness 1800 is adjusted to the desired size. After harness 1800 is adjusted to the desired size, locking ring 1823 is moved to a locked position by sliding toward adjustor ring 1821 to a position proximate to adjustor ring 1821.

Figure 19:
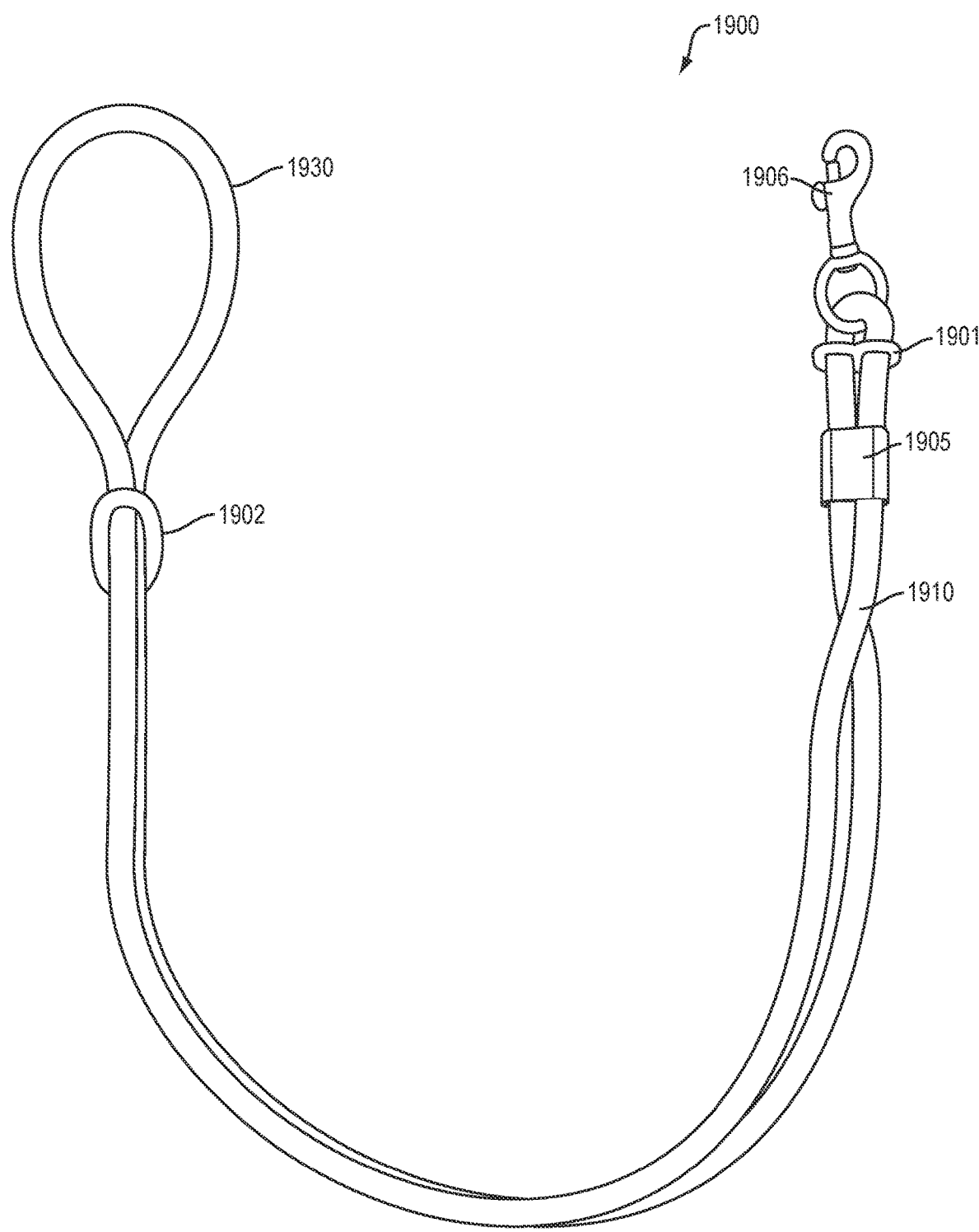
FIG. 19 is a schematic of a leash, consistent with the present invention.

FIG. 19 is a schematic of a leash that can be used with any of the collars and harnesses described herein. Leash 1900 comprises continuous cord 1910 having joint 1905, first ring 1901, second ring 1902, hook 1906 and handle 1930. First ring 1901 is optionally included to secure folded end of cord 1910 together. Second ring 1902 can be used to adjust the size, e.g., the circumference, of handle 1930. In some aspects, first and second rings 1901, 1902 can comprise a double loop ring. Hook 1906, for example, a swivel snap, can be used to connect leash 1900 to a collar or harness such as collar 1400, for example via ring 1401. Cord 1910 can be twisted along the entire length of leash 1900. Alternatively, a portion or portions of cord 1910 can be twisted or no portion of cord 1910 can be twisted.

A method of making leash 1900 starting from a single cord 1910 includes folding the cord in half forming two loose ends and a folded end; sliding a first ring 1901 along the cord via the two loose ends of the cord towards the folded end, securing tight; sliding a second ring 1902 along the cord via the two loose ends of the cord; creating a loop for a handle 1930 and feed the two loose ends of the cord back through the first ring; pulling both loose ends of the cord through the first ring until the desired handle size is created; optionally twisting the two loose ends of cord; feed one loose end of the cord through a ring; sliding the same loose end through a hook 1906; feeding the same loose end back through the ring and pull firm to lock the ring firmly against the hook; trimming both loose ends such they are the same length; stitching the two loose ends together, for example, with nylon waxed heavy gage thread; and securing the joint, for example, with a clamp.

All components described herein are modular and configurable, for example, any harness or collar be used with any adjustor assembly or leash, and a modular style leash can be used with a variety of handles.

While certain embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

I claim:

1. An animal restraint system comprising a continuous cord comprising two loose ends; wherein the cord is folded in half forming a first end comprising the two loose ends and a second end; wherein the first end comprises a joint configured to join the two loose ends; and wherein the first end further comprises a hook configured to connect to a collar or a harness and the second end comprises a ring or a hook configured to attach to a ring.

2. The system of claim 1 further comprising an adjustor assembly comprising at least one adjustor ring and at least one locking ring; wherein the cord length is adjustable when the adjustor assembly is in an unlocked position and the cord length is fixed when the adjustor assembly is in a locked position.

3. The system of claim 2 wherein the at least one adjustor ring is a single looped ring or a double looped ring.

4. The system of claim 2 wherein the at least one locking ring is a single looped ring or a double looped ring.

5. The system of claim 1 wherein at least a portion of the cord is twisted.

6. The system of claim 1 wherein the system comprises a collar.

7. The system of claim 1 wherein the system comprises a harness.

8. The system of claim 1 wherein the system comprises a handle.

9. The system of claim 1 wherein the system comprises a leash.

10. The system of claim 1 further comprising a second ring and a second hook, wherein the second hook is configured to connect to the second ring.

11. The system of claim 1 wherein the ring is configured to connect to a modular handle.

12. The system of claim 1 wherein the ring is configured to form a handle.

13. The system of claim 9 further comprising an adjustor assembly comprising at least one adjustor ring and at least one locking ring; wherein the cord length is adjustable when the adjustor assembly is in an unlocked position and the cord length is fixed when the adjustor assembly is in a locked position.

14. The system of claim 13 wherein the at least one adjustor ring is a single looped ring or a double looped ring.

15. The system of claim 13 wherein the at least one locking ring is a single looped ring or a double looped ring.

16. The system of claim 13 further comprising a second locking ring, wherein the second locking ring is a single looped ring or a double looped ring.

17. An animal restraint system comprising a continuous cord comprising two loose ends; wherein the cord is folded in half forming a first end comprising the two loose ends and a second end; wherein the first end comprises a joint configured to join the two loose ends; and an adjustor assembly comprising at least one adjustor ring comprising a single or a double loop ring and at least one locking ring comprising a single or a double loop ring; wherein the cord length is adjustable when the adjustor assembly is in an unlocked position and the cord length is fixed when the adjustor assembly is in a locked position.

* * * * *